(12) United States Patent
Kogiso et al.

(10) Patent No.: US 6,935,072 B2
(45) Date of Patent: Aug. 30, 2005

(54) WEATHER STRIP HAVING VARIABLE LENGTH HOLDING LIP

(75) Inventors: Harumi Kogiso, Nishikasugai-gun (JP); Kiminori Mine, Nishikasugai-gun (JP); Masaki Ohashi, Nishikasugai-gun (JP); Takaaki Sato, Nishikasugai-gun (JP); Tomofumi Nishikawa, Nishikasugai-gun (JP); Masahiro Nozaki, Nishikasugai-gun (JP); Toshihiro Nahara, Nishikasugai-gun (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 167 days.

(21) Appl. No.: 10/193,582

(22) Filed: Jul. 12, 2002

(65) Prior Publication Data

US 2003/0009947 A1 Jan. 16, 2003

(30) Foreign Application Priority Data

| Jul. 13, 2001 | (JP) | 2001-212995 |
| Jul. 13, 2001 | (JP) | 2001-212996 |
| Jul. 16, 2001 | (JP) | 2001-215192 |
| Jul. 27, 2001 | (JP) | 2001-228317 |

(51) Int. Cl.[7] ............................................. E06B 7/16
(52) U.S. Cl. ................................ 49/490.1; 49/475.1
(58) Field of Search ......................... 49/475.1, 490.1, 49/498.1

(56) References Cited

U.S. PATENT DOCUMENTS

| 4,584,150 A | | 4/1986 | Ballocca |
| 4,787,668 A | * | 11/1988 | Kawase et al. ............... 296/93 |
| 4,861,530 A | * | 8/1989 | Zaccaria ..................... 264/408 |
| 4,918,867 A | | 4/1990 | Hayashi et al. |
| 5,067,280 A | * | 11/1991 | Arima ...................... 49/498.1 |
| 5,085,006 A | * | 2/1992 | Hayashi et al. ............ 49/482.1 |
| 5,447,670 A | * | 9/1995 | Ito et al. .................... 264/146 |
| 5,679,303 A | * | 10/1997 | Hayashi et al. ............ 264/167 |
| 5,693,419 A | * | 12/1997 | Nozaki ....................... 428/354 |
| 5,783,312 A | * | 7/1998 | Laughman et al. ........ 428/573 |
| 5,958,318 A | * | 9/1999 | Hayashi ..................... 264/167 |
| 6,143,397 A | | 11/2000 | Kanchara |
| 6,250,018 B1 | * | 6/2001 | Kawai et al. .............. 49/479.1 |
| 6,405,489 B1 | * | 6/2002 | Miura ........................ 49/479.1 |
| 6,647,667 B2 | * | 11/2003 | Mine et al. ................. 49/490.1 |
| 2001/0027622 A1 | | 10/2001 | Mine et al. |

FOREIGN PATENT DOCUMENTS

| JP | 01-269525 | | 10/1989 |
| JP | 02-068240 | * | 3/1990 |
| JP | 10-006379 | | 1/1998 |
| JP | 2000-071901 | | 3/2000 |
| WO | WO 98/21061 | | 5/1998 |

* cited by examiner

Primary Examiner—Gregory J. Strimbu
(74) Attorney, Agent, or Firm—Posz Law Group, PLC

(57) ABSTRACT

A weather strip includes a trim body having a generally U-shaped cross section, a hollow seal portion that protrudes from an outside surface of the trim body, and a holding lip formed on the trim body so as to extend from an inside surface of the trim body toward the inside of the trim body. The weather strip is mounted on the vehicle body such that the trim body is held by a flange provided at a periphery of a door opening of a motor vehicle. The weather strip is formed by extrusion molding such that the length of the holding lip is changed in a stepped manner in accordance with the thickness of the flange.

10 Claims, 14 Drawing Sheets

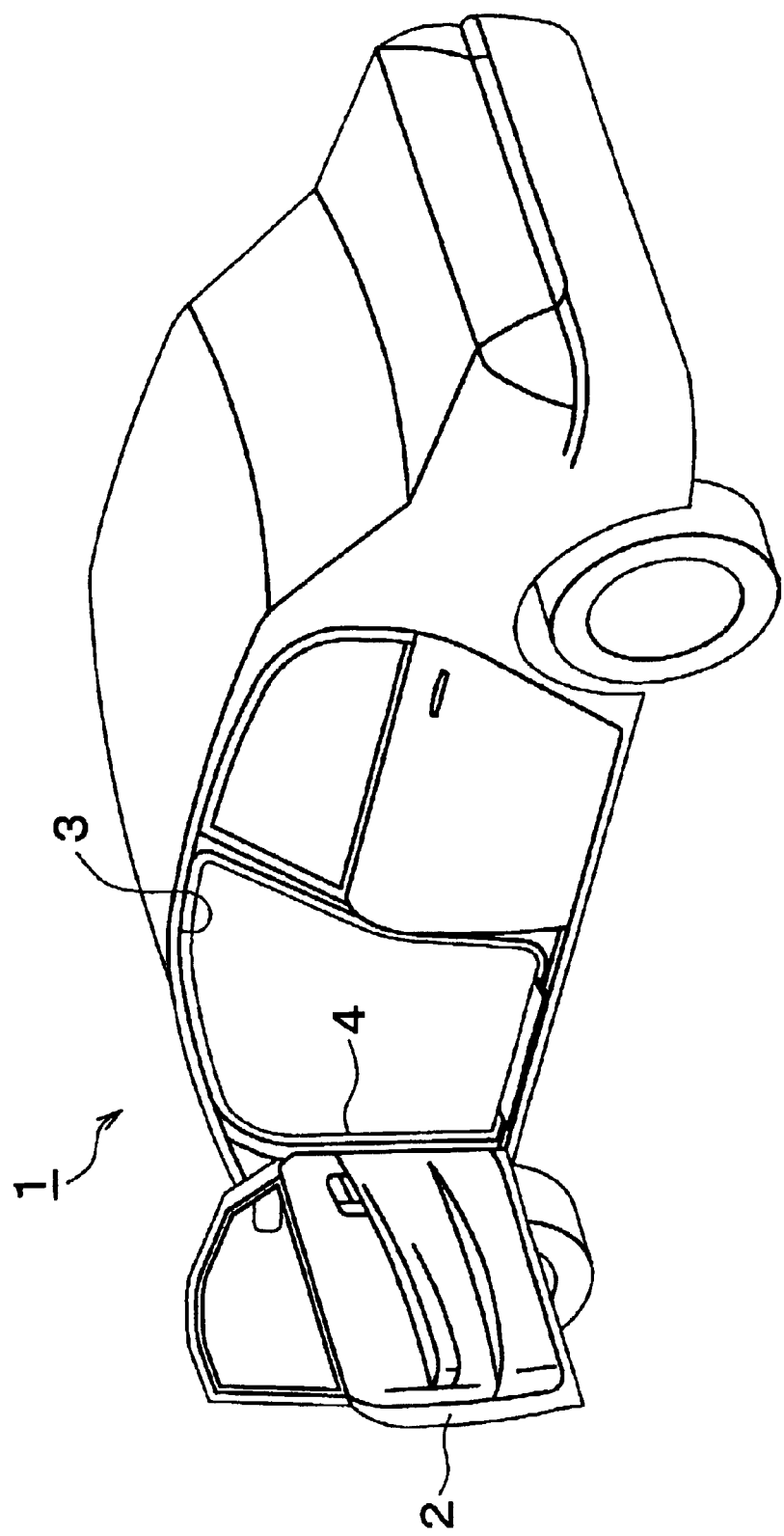

FLANGE THICKNESS: LARGE   FLANGE THICKNESS: SMALL

WEATHER STRIP HAVING VARIABLE LENGTH HOLDING LIP

INCORPORATION BY REFERENCE

The disclosures of Japanese Patent Applications No. 2001-212995 filed on Jul. 13, 2001, No. 2001-212996 filed on Jul. 13, 2001, No. 2001-215192 filed on Jul. 16, 2001 and No. 2001-228317 filed on Jul. 27, 2001, each including the specification, drawings and abstract, are incorporated herein by reference in their entirety.

BACKGROUND OF THE INVENTION

1. Field of the Invention

The invention relates to a weather strip provided on a periphery of a door opening of a motor vehicle, and also relates to a method of manufacturing the weather strip.

2. Description of Related Art

Generally, a weather strip, or the like, is provided on a periphery of a door opening of a motor vehicle, such as an automobile. The weather strip includes a trim body having a substantially U-shaped cross section, and a seal portion that has a hollow shape and projects from the trim body. The trim body is fitted onto a flange provided at the periphery of the door opening so as to be held in position. A metal insert is embedded in the trim body. Holding lips are formed integrally on inside surfaces of sidewalls of the trim body, such that each holding lip extends toward the inside of the trim body. When the weather strip is mounted on the vehicle body, the trim body is fitted onto the flange and is retained in position basically utilizing the elastic force applied from the holding lips. At the time of closing the door, an edge portion of the door comes in contact with and deforms the seal portion to thereby provide a seal between the door and the vehicle body. Most of or the entire length of the weather strip thus constructed is formed by so-called extrusion molding.

In the meantime, the thickness of the flange to which the weather strip is attached may vary from one portion thereof to another. In this case, if the size (length) of each holding lip is constant over the entire circumference of the weather strip, a load (which will be called "insertion load") required for inserting the flange into the trim body becomes large in a portion where the thickness of the flange is large, resulting in a reduced efficiency in attaching the weather strip to the vehicle body. In a portion where the thickness of the flange is small, on the other hand, the weather strip may be easily detached from the flange due to relatively small elastic force applied from the holding lips to the flange.

For preventing the above-described problems, extrusion molding for forming the weather strip may be carried out such that the projection length of each holding lip continuously varies in accordance with changes in the thickness of the flange. However, in the case where the thickness of the flange frequently changes, it is necessary to frequently change the length of each holding lip as well. Thus, the control of the length of the holding lips may become complicated, which may result in an increase in the cost. In addition, a desired projection length of the holding lip cannot be achieved if the length of the holding lip is changed with delay in relation to the thickness of the flange during extrusion molding. For avoiding this, therefore, the extrusion speed needs to be reduced to some extent, which, in turn, may result in a deterioration in the productivity or production efficiency. Still further, a certain degree of variations generally occur in the longitudinal position of the weather strip relative to the flange of the vehicle body during production and mounting of the strip on the flange. If such variations occur, the significance of precisely changing the length of the holding lip in accordance with the thickness of the flange may be lost. Namely, in the presence of the variations as described above, the weather strip may include a portion or portions in which the holding lip does not have an intended or desired projection length. In this case, the insertion load may be undesirably large.

Besides, such variations in the longitudinal position of the weather strip during production and mounting on the flange may cause the following problem. That is, when the weather strip is attached to the flange from its portion having a small thickness to its portion having a large thickness via a stepped portion between these portions, the projection length of the holding lip may be still large in a portion of the weather strip corresponding to the large-thickness portion of the flange located beyond the stepped portion. In this case, the insertion load required for inserting the flange into the weather strip may increase.

Furthermore, if the length of the holding lip is changed in accordance with the thickness of the flange as described above, the following problem may occur. That is, when the weather strip is formed into an annular shape through extrusion molding, the opposite end faces of the weather strip are bonded to each other, or the opposite end portions of the weather strip are set in a mold to be connected with each other by use of the mold molding. However, if the opposite end faces have different shapes (in this example, if the holding lip has different projection lengths at the end faces), the end faces may not be appropriately bonded to each other, or the structure of the mold used for connecting the opposite end portions of the weather strip may be undesirably complicated, causing a difficulty in connecting the end portions by using the mold.

A plurality of weather strips can be successively formed through extrusion molding. In this case, if the projection length of the holding lip is different between the leading and trailing end portions of one whether strip, an additional extruded portion, which will be wasted, is needed for allowing for a change from the length of the holding lip at the trailing end portion of the one weather strip to that at the leading end portion of the next weather strip. Consequently, the yield will be lowered and thereby the production efficiency will be decreased.

SUMMARY OF THE INVENTION

It is one object of the invention to provide a weather strip that can be mounted on the vehicle body with improved reliability or stability, while preventing deterioration in the productivity and the efficiency with which the weather strip is mounted on the vehicle body. It is another object of the invention to provide a method of manufacturing such a weather strip. It is a further object of the invention to provide a weather strip and a method of manufacturing the same, which do not suffer from deterioration in the efficiency in mounting the weather strip on the vehicle body even when a certain degree of variations in the longitudinal position of the weather strip with respect to the vehicle body occur during production and mounting of the weather strip on the vehicle body. It is still another object of the invention to provide a weather strip, a method of manufacturing the weather strip, and a mounting structure of the weather strip on the vehicle body, which are free from a conventional problem(s) at the time of bonding or joining of the end portions of the weather strip, and which do not suffer from a reduction in the production efficiency when a plurality of weather strips are successively produced.

To accomplish at least one of the above objects and/or other object(s), there is provided according to a first aspect of the invention a method of manufacturing a weather strip including (a) a trim body having a generally U-shaped cross section, the trim body being adapted to be held by a flange provided at a periphery of an opening formed in a motor vehicle, (b) a hollow seal portion that protrudes from an outer surface of the trim body, the seal portion being adapted to come in contact with a closure member that closes the opening, and (c) a holding lip formed on the trim body so as to extend from an inside surface of the trim body toward the opposite inside surface of the trim body. According to the method, the weather strip is fanned by extrusion molding such that a length of the holding lip changes in a stepped manner in accordance with a thickness of the flange.

According to the method as described above, the trim body having a U-shaped cross-section is held by the flange provided at the periphery of the door opening of the vehicle, and the hollow seal portion that protrudes from the trim body is pressed against the periphery of the door upon closing of the door, so that a seal is provided between the vehicle body and the door. Also, the weather strip is kept attached to the flange by means of a holding lip that extends from the inside surface of the trim body toward the inside of the trim body. In manufacturing the weather strip constructed as described above, the weather strip is formed by extrusion molding, during which the length of the holding lip changes in a stepped manner in accordance with the thickness of the flange. Thus, the length of the holding lip is reduced in a portion of the weather strip corresponding to a large-thickness portion of the flange, thereby preventing an otherwise possible increase in a load required for inserting the flange into the trim body of the weather strip. On the other hand, the length of the holding lip is increased in a portion of the weather strip corresponding to a small-thickness portion of the flange, thus assuring a sufficiently large elastic force applied from the holding lip to the flange, and thereby preventing the weather strip from being detached from the flange. Furthermore, the length of the holding lip is not continuously changed, but changed in a stepped manner. Therefore, complicated control will not be required for changing the length of the holding lip, and an otherwise possible increase in the cost can be avoided. Moreover, even in the case where the thickness of the flange varies frequently, the length of the holding lip can be changed without substantial delay, whereby a desired lip length can be achieved. In addition, since it is unnecessary to perform accurate control for continuously changing the length of the holding lip, the extrusion speed can be increased, assuring an improved production efficiency. Even in the case where some variations arise in the longitudinal position of the weather strip relative to the flange during production and mounting thereof, such variations are likely to be absorbed, thus avoiding an otherwise possible increase in the insertion load and reducing a possibility of detachment of the weather strip from the vehicle body.

According to a second aspect of the invention, there is provided a weather strip including (a) a trim body having a generally U-shaped cross section, the trim body being adapted to be held by a flange provided at a periphery of an opening formed in a motor vehicle, (b) a hollow seal portion that protrudes from an outside surface of the trim body, the seal portion being adapted to come in contact with a closure member that closes the opening, and (c) a holding lip formed on the trim body so as to extend from an inside surface of the trim body toward the inside of the trim body. In this weather strip, the holding lip includes a plurality of constant-length sections having respective predetermined lengths that are set in accordance with a thickness of the flange, and at least one varying-length section located between the constant-length sections, and the length of the holding lip varies from one of the respective predetermined lengths to another in each of the at least one varying-length section. The weather strip according to the second aspect of the invention yields substantially the same effects as those as described above with respect to the first aspect of the invention.

In one preferred embodiment of the second aspect of the invention, a first length of the holding lip corresponding to at least a large-thickness section of the flange having a large thickness is made smaller than a second length of the holding lip corresponding to a small-thickness section of the flange having a small thickness, and each section of the weather strip in which the holding lip has the first length is made longer by a predetermined length than the large-thickness section of the flange as viewed in the longitudinal direction of the weather strip.

In the embodiment as described above, the length of the holding lip corresponding to at least the large-thickness section of the flange is made smaller than the length of the holding lip corresponding to the small-thickness section of the flange. Thus, in the large-thickness section of the flange, in particular, a stress (i.e., the insertion load) is less likely to increase upon fitting of the weather strip on the flange since the length of the holding lip is reduced. Furthermore, each section of the weather strip in which the holding lip has a reduced length is made longer by a predetermined length than the large-thickness section of the flange. Thus, even in the case where some variations arise in the longitudinal position of the weather strip relative to the flange during production and mounting thereof, the insertion load is prevented from increasing due to the presence of a long holding lip in the large-thickness section of the flange. Accordingly, the weather strip can be mounted with improved efficiency.

In another preferred embodiment of the second aspect of the invention, the length of the holding lip is changed along the longitudinal direction of the weather strip in accordance with the thickness of the flange so that the length of the holding lip decreases with an increase in the thickness of the flange, and the holding lip includes longitudinally opposite end portions having substantially the same length.

In the embodiment as described above, the length of the holding lip is changed along the longitudinal direction of the weather strip in accordance with the thickness of the flange. Thus, the holding lip is shortened in a portion of the weather strip corresponding to a large-thickness portion of the flange, and therefore the flange can be inserted in the trim body of the weather strip with a reduced load or stress. On the other hand, the length of the holding lip is increased in a portion of the weather strip corresponding to a small-thickness portion of the flange, thus assuring a sufficiently large elastic force applied from the holding lip to the flange, and thereby preventing the weather strip from being detached from the flange. Here, the holding lip includes longitudinally opposite end portions having substantially the same length. If the weather strip is formed into an annular shape, for example, the front and rear end faces of the weather strip can be easily and accurately joined to each other. Alternatively, the front and rear end portions of the weather strip are favorably connected to each other using a metal mold molding, without requiring the mold to have a complicated shape or construction. If a plurality of weather strips are to be continuously formed by extrusion molding, the weather strips can be successively produced without loss or waste, while preventing deterioration in the yield and the production efficiency.

BRIEF DESCRIPTION OF THE DRAWINGS

The foregoing and/or further objects, features and advantages of the invention will become more apparent from the following description of exemplary embodiments with reference to the accompanying drawings, in which like numerals are used to represent like elements and wherein:

FIG. 2 is a perspective view showing a motor vehicle in which the weather strip of FIGS. 1A, 1B and 1C is mounted;

DETAILED DESCRIPTION OF PREFERRED EMBODIMENTS

Figure 1A:
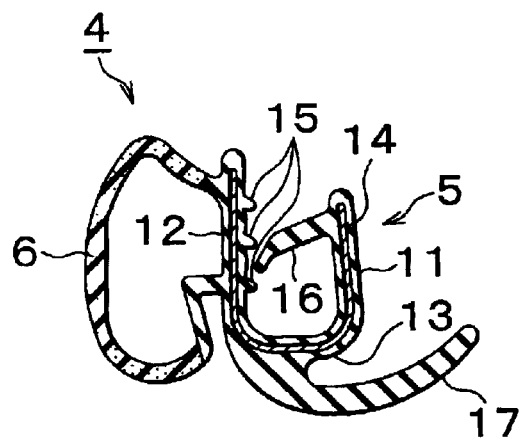
FIGS. 1A, 1B, and 1C are cross-sectional views showing different sections of a weather strip according to one exemplary embodiment of the invention.

Hereinafter, a first embodiment of the invention will be described with reference to the attached figures. As shown in FIG. 2, a weather strip 4 is provided on a periphery of a door opening 3 that faces a door 2 located on one side of a vehicle 1. The weather strip 4 of the embodiment is attached to the entire periphery of the door opening 3 except for its bottom portion, and is entirely formed by extrusion molding.

As shown in FIGS. 1A to 1C and FIGS. 3A to 3C, the weather strip 4 includes a trim body 5 and a seal portion 6. The trim body 5 includes an inner sidewall 11 facing the inside of the vehicle, an outer sidewall 12 facing the outside of the vehicle, and a connecting portion 13 connecting the sidewalls 11, 12. The connecting portion 13 has a substantially curved shape in section and thus the trim body 5 as a whole has a substantially U-shaped cross section. The trim body 5 is formed of EPDM (ethylene-propylene-diene terpolymer) solid rubber and includes a metal insert 14 embedded therein.

A plurality of holding lips 15 are formed integrally on the inside surface of the outer sidewall 12. Each of the holding lips 15 projects toward the inside of the trim body 5 (namely, toward the inside of the vehicle in the vehicle width direction). Each of the holding lips 15 has a constant size or length over the entire circumference of the weather strip 4. On the other hand, a variable holding lip 16 is formed integrally on the inside surface of the inner sidewall 11. The variable holding lip 16 also projects toward the inside of the trim body 5 (namely, toward the outside of the vehicle in the vehicle width direction). Further, a cover lip 17 for covering an edge of the interior, such as a garnish (not shown), is formed as an integral part of the connecting portion 13.

The seal portion 6 projects from the outside surface of the outer sidewall 12 toward the outside of the vehicle and has a hollow shape. The seal portion 6 is formed of EPDM sponge rubber. When the door 2 is closed, the seal portion 6 is deformed to provide a seal between the door 2 and the vehicle 1.

Figure 3A:
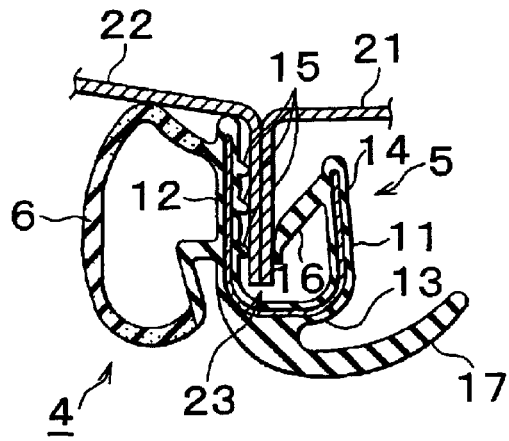
FIGS. 3A, 3B, and 3C are cross-sectional views showing different sections of a mounting structure in which the weather strip of FIGS. 1A, 1B and 1C is mounted on the vehicle body having a flange whose thickness varies from one portion to another.
Figure 3B:
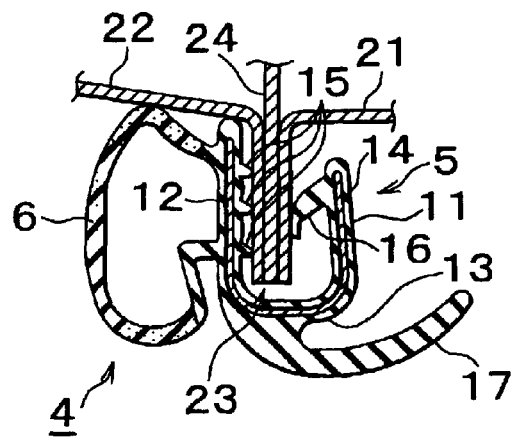
Figure 3C:
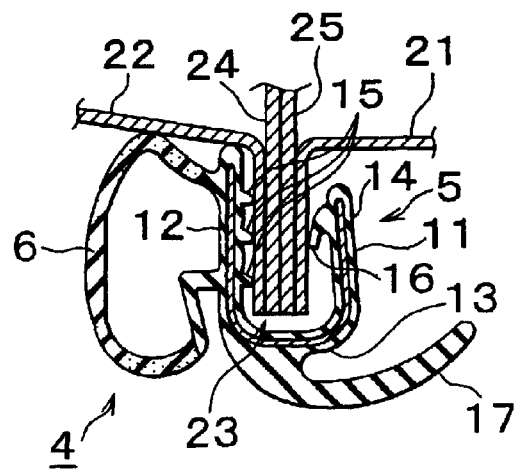

The weather strip 4 is attached to the vehicle by fitting the trim body 5 onto the periphery of the door opening 3. More specifically, the vehicle body includes an inner panel 21 and an outer panel 22, and a flange 23 is formed by joining edge portions of at least the inner and outer panels 21, 22. In the embodiment, the thickness of the flange 23 varies depending upon the location of each portion thereof. For example, the flange 23 includes a portion or portions simply formed by joining the inner panel 21 and the outer panel 22 as shown in FIG. 3A. The flange 23 includes other portions in which a reinforce member or members 24, 25 each having a plate-like shape is inserted between the panels 21, 22, as shown in FIGS. 3B and 3C. More specifically, FIG. 3B shows a portion of the flange 23 in which one reinforce member 24 is provided, and FIG. 3C shows a portion of the flange 23 in which two reinforce members 24 and 25 are provided. The reinforce members 24 and 25 are provided for improving the strength of the flange 23.

According to the embodiment, therefore, the length of the variable holding lip 16 varies in the longitudinal direction of the weather strip 4 basically depending upon the thickness of the flange 23. Unlike the conventional weather strip in which the length of the holding lip is changed continuously, gradually and accurately, the length of the variable holding lip 16 is changed or switched, for example, among three lengths.

Figure 4:
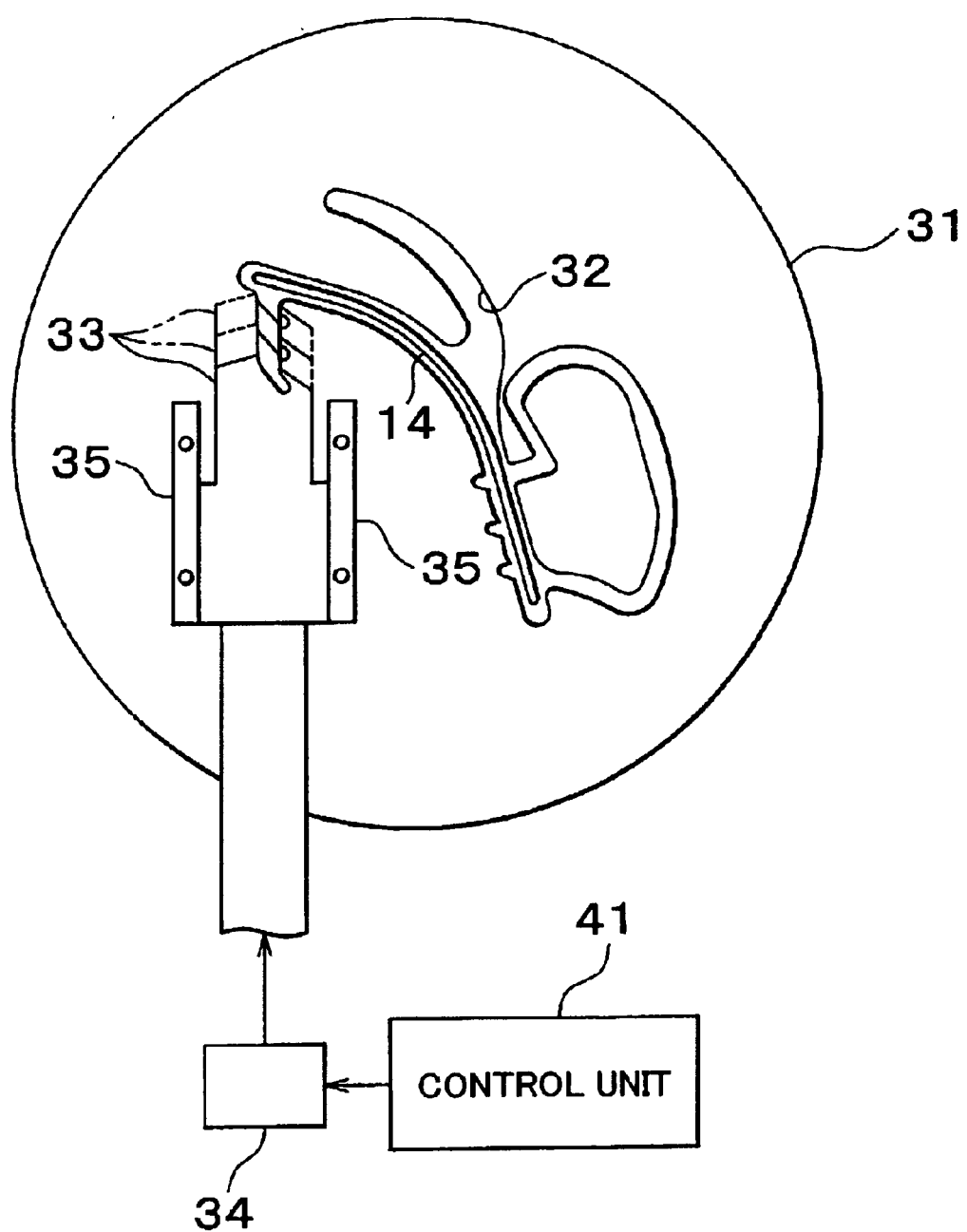
FIG. 4 is a view schematically showing a die and others which are used for extrusion molding of the weather strip.

FIG. 4 schematically shows a die 31 and others used for forming the weather strip 4 by extrusion molding. The die 31 includes a forming aperture 32 through which an unvulcanized rubber material is extruded so as to form the weather strip 4. A portion of the forming aperture 32 corresponding to the trim body 5 has a substantially flat shape, and the rubber material is extruded through the thus formed aperture 32, followed by a step in which the formed article is curved into its final shape. Into the above-indicated portion of the forming aperture 32 is also continuously supplied the insert 14 as well as the unvulcanized rubber material.

Further, a shutter 33 and an actuator 34 are provided as a mechanism for changing the length of the variable holding lip 16 among three lengths. Guide rails 35 are provided at both sides of the shutter 33, and the shutter 33 is slidable along the guide rails 35. As the shutter 33 slides, the length of a portion of the forming aperture 32 corresponding to the variable holding lip 16 can be changed in a stepped manner. The shutter 33 is constructed and is operated to slide such that the tip of each of the variable holding lips 16 having different lengths is formed into a constant or uniform shape. The actuator 34 serves to drive the shutter 33 to slide. A known actuator, such as a cylinder, a cam mechanism, or a motor, may be used as the actuator 34 as needed. The operation of the actuator 34 is controlled by a control unit 41.

Hereinafter, an extrusion molding process as a main process for manufacturing the weather strip 4 constructed as described above will be described.

Figure 5A:
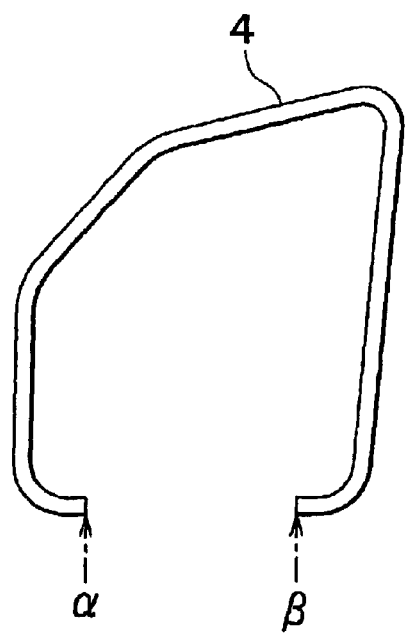
FIG. 5A is a side view schematically showing the weather strip.
Figure 5B:
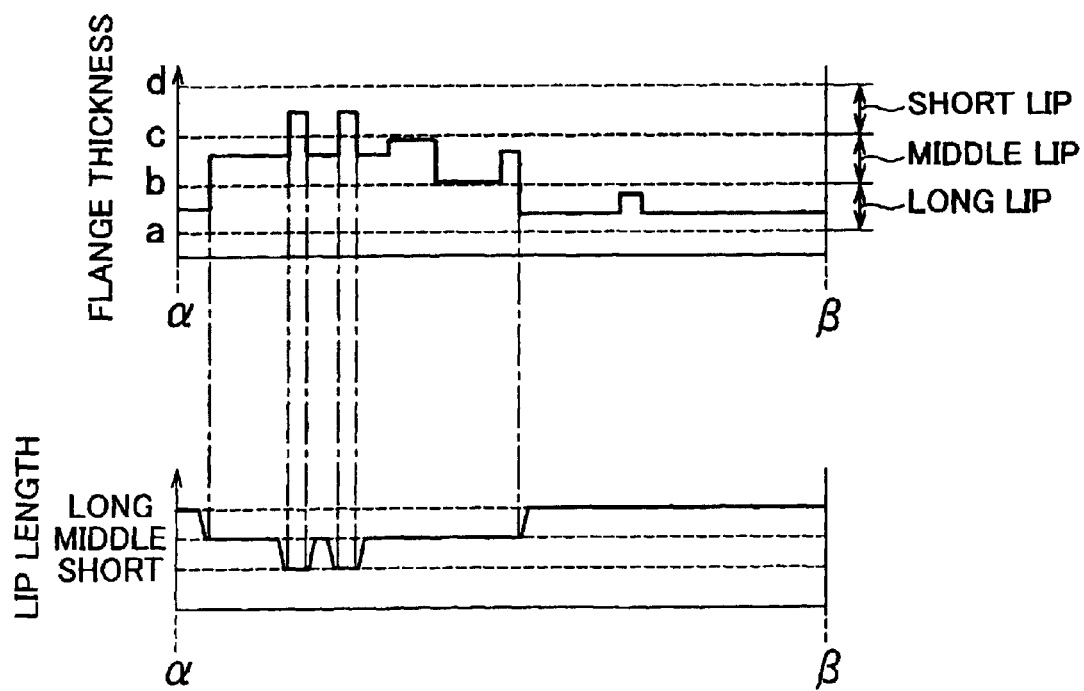
FIG. 5B is a chart showing data representing the relationship between the thickness of a flange of the vehicle body and the length of a variable holding lip as viewed in the longitudinal direction of the weather strip.

The control unit 41 stores data regarding the thickness of the flange 23 which varies along the longitudinal direction of the weather strip 4 (refer to FIGS. 5A and 5B). More specifically, the data stored in the control unit 41 represents the thickness of the flange 23 corresponding to respective portions of the weather strip 4 over its entire length from one end face α to the other end face β as shown in FIG. 5A. The control unit 41 controls the actuator 34 on the basis of the above-described data.

More specifically, as shown in FIG. 5B, when the thickness of the flange 23 is within a range between "c" and "d" which is a relatively large thickness range, the thickness of the flange 23 is classified as being "large thickness." In this case, the target length of the variable holding lip 16 is determined to be short, and the actuator 34 is controlled so as to place the shutter 33 in the upper position in FIG. 4. Thus, the actual length of the variable holding lip 16 corresponding to the portion of the flange 23 having a relatively large thickness is made short.

When the thickness of the flange 23 is within a range between "b" and "c" which is a middle thickness range, the thickness of the flange 23 is classified as being "middle thickness." In this case, the target length of the variable holding lip 16 is determined to be middle, and the actuator 34 is controlled so as to place the shutter 33 in the middle position in FIG. 4. Thus, the actual length of the variable holding lip 16 corresponding to the portion of the flange 23 having a middle thickness is made middle. Further, when the thickness of the flange 23 is within a range between "a" and "b" which is a relatively small thickness, the thickness of the flange 23 is classified as being "small thickness." In this case, the target length of the variable holding lip 16 is determined to be long, and the actuator 34 is controlled so as to place the shutter 33 in the lower position in FIG. 4. Thus, the actual length of the variable holding lip 16 corresponding to the portion of the flange 23 having a small thickness is made long.

In accordance with changes in the target length of the variable holding lip 16 as shown in FIG. 5B, the length of the variable holding lip 16 is changed in a stepped manner not gradually, but instead relatively quickly (i.e., within a short time). In this embodiment, it is empirically revealed that variations in the length of the weather strip 4 during production thereof is approximately in a range of ±15 mm, and variations or errors in the longitudinal position of the weather strip 4 that occur upon mounting of the strip 4 on the vehicle body are approximately in a range of ±5 mm. Therefore, the total variations in the longitudinal position of the weather strip 4 during production and mounting thereof will be within a range of ±20 mm at maximum. In the embodiment, therefore, the length of a varying-length portion of the weather strip 4 in which the length of the variable holding lip 16 is changed or switched from one of three set values to another is controlled to be equal to or shorter than 40 mm, which is the maximum range of the variations. For example, the length of the above-mentioned varying-length portion of the weather strip 4 is controlled to 35 mm.

In the weather strip 4 obtained by the manufacturing method according to the embodiment as described above, the variable holding lip 16 has one of the above-indicated three set lengths, namely, long, middle, and short, over most of the entire length of the weather strip 4. Thus, the overall length of portions of the weather strip 4 in which the length of the variable holding lip 16 is changed from one of the set lengths to another is considerably reduced.

In the embodiment as described above in detail, when the thickness of the flange 23 is within the range between "c" and "d", the thickness of the flange 23 is classified as being "large thickness", and the target length of the variable holding lip 16 is then determined to be short. Thus, the actual length of the variable holding lip 16 corresponding to a portion of the flange 23 having a relatively large thickness is made short. Accordingly, a load (which will be referred to as "insertion load") required for inserting the flange 23 into the weather strip 4 (trim body 5) is less likely to increase due to the relatively large thickness of the flange 23, and the weather strip 4 can be mounted on the vehicle body with improved efficiency and ease. Conversely, when the thickness of the flange 23 is within the range between "a" and "b", the thickness of the flange 23 is classified as being "small thickness", and the target length of the variable holding lip 16 is then determined to be long. With the target length thus determined, the actual length of the variable holding lip 16 corresponding to a portion of the flange 23 having a relatively small thickness is made long. Accordingly, the weather strip 4 can be mounted on the vehicle body with improved reliability or stability, assuring sufficiently large elastic force applied to the flange 23, so that the weather strip 4 is less likely to be detached from the vehicle body.

Furthermore, since the length of the variable holding lip 16 is changed in a stepped manner (namely, changed from one of three set values to another), control for changing the length of the variable holding lip 16 need not be complicated, and therefore an increase in the cost which would otherwise arise due to complicated control can be suppressed or prevented. Further, even if the thickness of the flange 23 frequently changes, the above-described problem that a desired length of the variable holding lip 16 cannot be achieved due to the delay in changing the length can be also prevented. Moreover, since the length of the variable holding lip 16 does not need to continuously change with high accuracy, the extrusion speed may be increased, thus assuring improved productivity or efficiency with which the weather strip 4 is manufactured.

Also, even if variations or errors in the longitudinal position of the weather strip 4 occur during production and mounting of the weather strip 4, the variations are likely to be reduced or eliminated, and therefore problems, such as an increase in the insertion load or easy detachment of the weather strip, are less likely to occur. In this embodiment, in particular, the length of the varying-length longitudinal portion of the weather strip 4 is made equal to or shorter than the maximum range of the total variations during production and mounting of the weather strip 4. With this arrangement, problems resulting from frequent changes in thickness of the flange 23 can be prevented. Furthermore, even if certain variations in the longitudinal position of the weather strip 4 occur during production and mounting on the vehicle body, such portions of the weather strip 4 that suffer from the variations can be minimized.

Still further, in the embodiment, the holding lips 15 provided on the inner surface of the outside sidewall 12 have a constant length over the entire length of the weather strip 4, while the length of the variable holding lip 16 provided on the inner surface of the inside sidewall 11 is changed. Therefore, the target length of the variable holding lip 16, and the like, can be easily determined in accordance with the the thickness of the flange 23, whereby the insertion load and the holding force (for holding the flange 23) can be easily adjusted. In addition, since only the length of the variable holding lip 16 is changed, the control can be simplified compared to the case where the lengths of both the holding lips 15 and the holding lip 16 are changed.

It is to be understood that the invention is not limited to the above-described embodiment, but may also be embodied in any of the following manners, by way of example. Needless to say, the invention may be applied with changes or modifications other than those as described below.

Figure 6:
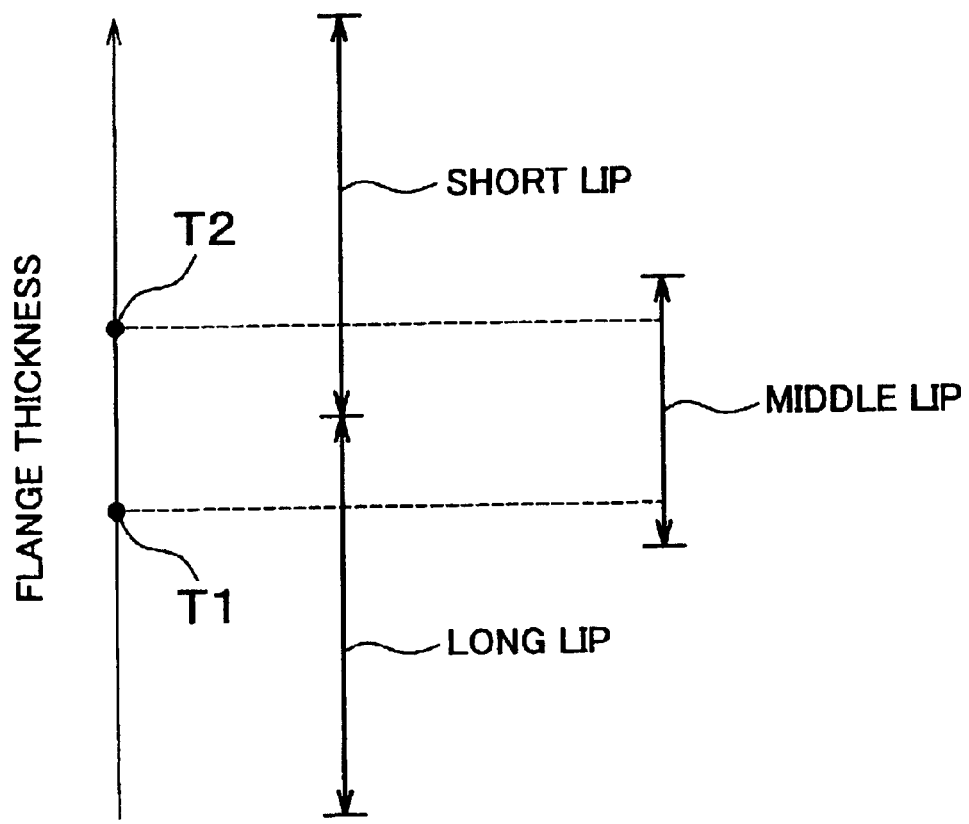
FIG. 6 is a diagram for explaining another manner of setting a target length of the variable holding lip in relation to the thickness of the flange.

(a) In the above-described embodiment, when the thickness of the flange 23 is within the range between "c" and "d", the thickness of the flange 23 is classified as being "large thickness", and the target length of the variable holding lip 16 is then determined to be short. Likewise, when the thickness of the flange 23 is within the range between "b" and "c", the thickness of the flange 23 is classified as being "middle thickness", and the target length of the variable holding lip 16 is determined to be middle. Further, when the thickness of the flange 23 is within the range between "a" and "b", the thickness of the flange 23 is classified as being "small thickness", and the target length of the variable holding lip 16 is determined to be long. However, the range of the thickness of the flange 23 that corresponds to one of the target lengths (large, middle, short) may overlap the range of the thickness of the flange 23 that corresponds to another target length. More specifically described with reference to FIG. 6, when the thickness of the flange 23 is T1, the target length can be set to a selected one of "long" and "middle", which is more desirable or convenient in view of the circumstances. In the same manner, when the thickness of the flange 23 is T2, the target length can be set to a selected one of "middle" and "short", which is more desirable or convenient in view of the circumstances.

(b) In the above-described embodiment, the invention is applied to the method of manufacturing the weather strip 4 provided on the periphery of the door opening 3 of the vehicle body that faces the door 2 (side-front door). However, the invention may be applied to methods of manufacturing weather strips provided on the periphery of the other doors, such as a rear door, a back door, a luggage door (trunk lid), and a roof door (a sliding roof panel).

(c) While the length of the variable holding lip 16 is changed among three lengths in the above-described embodiment, the length may be changed between two lengths or among four lengths or more. For realizing simple control, however, the length of the variable holding lip 16 is preferably changed among five lengths or less, and more preferably among four lengths or less.

(d) While the trim body 5 is formed of solid rubber and the seal portion 6 is formed of sponge rubber in the above-described embodiment, the trim body 5 and the seal portion 6 may be formed of the same material. Further, while EPDM is referred to as an example of the material for forming the weather strip 4 in the above-described embodiment, other rubber materials, such as IR (isoprene rubber) and CR (chloroprene rubber), thermoplastic olefin-containing elastomer (TPO), or other materials, such as flexible polyvinyl chloride, having a rubber-like elasticity may be used as a material for the weather strip 4.

(e) While the weather strip 4 is attached to almost the entire periphery of the door opening 3 except for the bottom portion in the above-described embodiment, the weather strip 4 may be attached to the entire periphery of the door opening 3, or may be attached to only a part of the periphery of the door opening 3. The invention may also be applied to extrusion molded parts of a weather strip that are connected to each other by use of a mold molding.

(f) The invention may also be applied to a weather strip in which the insert 14 is not provided.

(g) The invention may also be applied to a weather strip in which a plurality of variable holding lips extend from one sidewall (for example, the inner sidewall 11) of a trim body.

Hereinafter, a second embodiment of the invention will be described with reference to the attached figures. In the embodiment, the weather strip 4 includes the trim body 5 and the seal portion 6 as in the first embodiment shown in FIGS. 1A to 1C and FIGS. 3A to 3C. A plurality of the holding lips 15 are formed integrally on the inside surface of the outer sidewall 12 of the trim body 5. Each of the holding lips 15 projects toward the inside of the trim body 5. On the other hand, the variable holding lip 16 is formed integrally on the inside surface of the inner sidewall 11. The variable holding lip 16 also projects toward the inside of the trim body 5. As in the first embodiment, the length of the variable holding lip 16 is changed, for example, among three lengths.

The weather strip 4 is attached to the vehicle body by fitting the trim body 5 onto the periphery of the door opening 3. More specifically, the vehicle body includes the inner panel 21 and the outer panel 22, and the flange 23 is formed by joining edge portions of at least the inner and outer panels 21, 22. Similarly to the first embodiment, the thickness of the flange 23 varies from one portion thereof to another, depending upon whether the reinforce members 24 and 25 are provided, as shown in FIGS. 3A to 3C. In this embodiment, therefore, the length of the variable holding lip (projection) 16 varies along the longitudinal direction of the weather strip 4 in accordance with the thickness of the flange 23.

For example, it is assumed that the flange 23 includes a large-thickness portion having a relatively large thickness, and a portion or portions having a middle thickness (which will be called "small-thickness portion(s)" for the sake of convenience) located on one side or both sides of the large-thickness portion, with a stepped portion(s) interposed therebetween. In this embodiment, a section of the variable holding lip 16 corresponding to the large-thickness portion of the flange 23 has a relatively small length, and the short section of the variable holding lip 16 extends over the stepped portion(s) into the small-thickness portion(s) of the flange 23.

Figure 7:
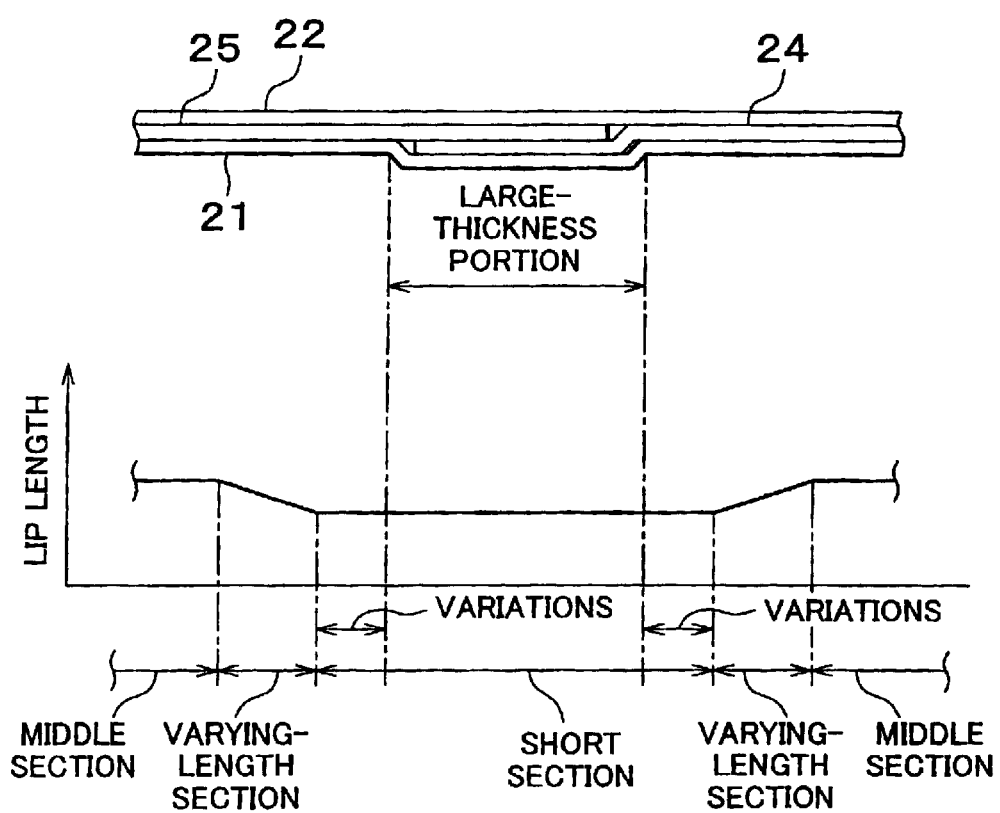
FIG. 7 is a diagram for explaining the relationship between the thickness of the flange and the length of the variable holding lip as viewed in the longitudinal direction of the weather strip, according to a second embodiment of the invention.

In one example as shown in FIG. 7, the large-thickness portion of the flange 23 is composed of four panels (the inner panel 21, the outer panel 22, and the reinforce members 24 and 25), and the small-thickness portions each composed of three panels (the inner panel 21, the outer panel 22, and one of the reinforce members 24, 25) are provided on both sides of the large-thickness portion with stepped portion interposed therebetween. In this embodiment, the target length of the variable holding lip 16 is set to be short with respect to not only a section of the holding lip 16 corresponding to the large-thickness portion of the flange 23, but also additional sections which extend by a predetermined length on both sides of the above section corresponding to the large-thickness portion. In the resulting weather strip 4, the short section of the variable holding lip 16 is longer by a predetermined length than the section in which the large-thickness portion of the flange 23 exists.

The predetermined length of the above-described additional regions is set in the following manner. In this embodiment, it is empirically revealed that variations in the length of the weather strip 4 during production thereof is approximately in a range of ±15 mm, and variations or errors in the longitudinal position of the weather strip 4 that occur upon mounting of the strip 4 on the vehicle body are approximately in a range of ±5 mm. Therefore, the total variations in the longitudinal position of the weather strip 4 during production and mounting thereof will be within a range of ±20 mm at maximum. Accordingly, the predetermined length is set to 20 mm for each side, namely, 40 mm in total, so that the large-thickness portion of the flange 23 is surely covered with a portion of the weather strip 4 having a short section of the variable holding lip 16 even in the event of the maximum variations.

In accordance with changes in the target length of the variable holding lip 16, the length of the variable holding lip 16 is changed in a stepped manner not gradually, but instead relatively quickly (i.e., within a short time). More specifically, in the present embodiment, the length of the short section of the variable holding lip 16 as measured in the longitudinal direction of the weather strip 4 is made larger than that of the large-thickness portion of the flange 23 in view of the variations during production and mounting of the weather strip 4. In the case where no variations take place, therefore, there may be portions of the weather strip 4 in which the projection length of the variable holding lip 16 is short even though the corresponding portion of the flange 23 has a middle thickness. For minimizing the length of such portions of the weather strip 4, therefore, the length of the varying-length sections of the variable holding lip 16 as measured in the longitudinal direction of the weather strip 6 is set to 35 mm, by way of example. Thus, the length of the portions of the weather strip 4 in which the holding force of the variable holding lip 16 is somewhat small can be minimized, whereby problems, such as detachment of the weather strip 4, can be avoided or suppressed.

According to the second embodiment as described above in detail, the following effect can be obtained in addition to the effects as described above with respect to the first embodiment.

In the case where the small-thickness portion(s) of the flange 23 exists on one side or both sides of the large-thickness portion, with the stepped portion(s) interposed therebetween, the projection length of the variable holding lip 16 is set to be short in portions of the weather strip 4 corresponding to not only the large-thickness portion of the flange 23 but also part of its small-thickness portion(s) as well as the stepped portions. Namely, the length of the portion of the weather strip 4 in which the projection length of the variable holding lip 16 is short is set to be longer than the length of the large-thickness portion of the flange 23 as measured in the longitudinal direction of the weather strip 4. Thus, even in the case where some variations arise in the longitudinal position of the weather strip 4 during production and mounting thereof, the insertion load with which the flange 23 is inserted in the weather strip 4 is prevented from increasing due to the relatively large projection length of the variable holding lip 16 facing the large-thickness portion of the flange 23. Consequently, the weather strip 4 can be mounted on the vehicle body with improved efficiency and ease.

It is to be understood that the invention is not limited to the above-described embodiment, but may be modified in the manners (b) to (g) as described above by way of example. Needless to say, the invention may be applied with changes or modifications other than those as described below. For example, while the length of the variable holding lip 16 is changed among three lengths over almost the entire periphery of the weather strip 4 in the above-described embodiment, the length of the variable holding lip 16 may be continuously and gradually changed in one or more portion(s) of the weather strip 4.

Figure 8:
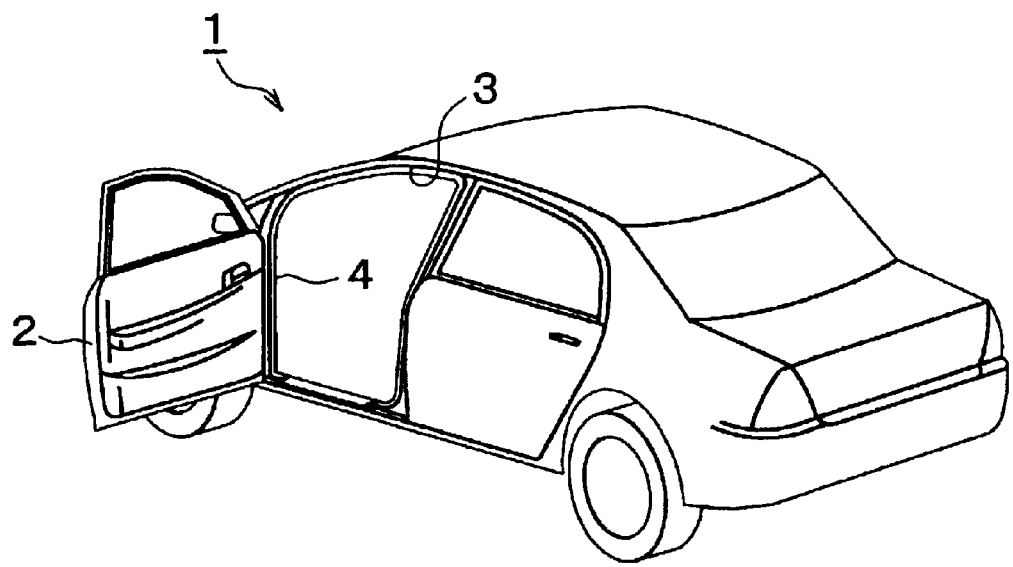
FIG. 8 is a perspective view showing a motor vehicle in which a weather strip according to a third embodiment of the invention is mounted.
Figure 9:
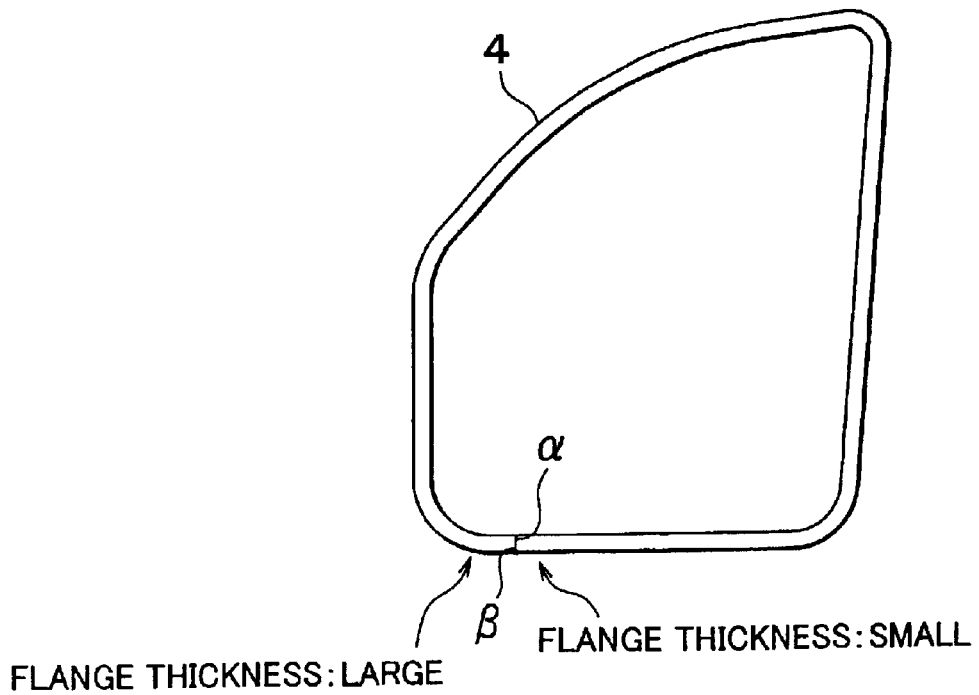
FIG. 9 is a side view schematically showing the weather strip of the third embodiment.

Hereinafter, a third embodiment of the invention will be described with reference to FIG. 8 and FIG. 9. As shown in FIG. 8, the weather strip 4 is provided on the periphery of the door opening 3 that faces the door 2 disposed on one side of the vehicle 1. The weather strip 4 according to this embodiment is attached to the entire periphery of the door opening 3, and is entirely formed by extrusion molding. The weather strip 4 is obtained as one of a plurality of whether strips formed by extrusion molding. As shown in FIG. 9, the opposite end faces α and β of the weather strip 4 are joined to each other. A portion of the weather strip 4 in which the end faces α and β are joined together is located at the lower, front side of the door opening 3 (i.e., the lower, left side in FIG. 3).

As in the first embodiment as shown in FIGS. 1A to 1C and FIGS. 3A to 3C, the weather strip 4 according to the third embodiment includes the trim body 5 and the seal member 6. A plurality of the holding lips 15 are formed integrally on the inside surface of the outer sidewall 12 of the trim body 5. Each of the holding lips 15 projects toward the inside of the trim body 5. On the other hand, the variable holding lip 16 is formed integrally on the inside surface of the inner sidewall 11. The variable holding lip 16 also projects toward the inside of the trim body 5. As in the first embodiment, the length of the variable holding lip 16 is changed, for example, among three lengths.

The weather strip 4 is attached to the vehicle body by fitting the trim body 5 onto the periphery of the door opening 3. More specifically, the vehicle body includes the inner panel 21 and the outer panel 22, and the flange 23 is formed by joining edge portions of at least the inner and outer panels 21, 22. Similarly to the first embodiment, the thickness of the flange 23 varies from one portion thereof to another, depending upon whether the reinforce members 24 and 25 are provided, as shown in FIGS. 3A to 3C. In this embodiment, therefore, the length of the variable holding lip (projection) 16 varies along the longitudinal direction of the weather strip 4 in accordance with the thickness of the flange 23.

Here, a portion of the flange 23 corresponding to a front end potion of the weather strip 4 including the end face α needs to be reinforced since it is located close to a hinge.

Therefore, the above portion of the flange 23 is desired to have a large thickness. In contrast, a portion of the flange 23 corresponding to a rear end portion of the weather strip 4 including the rear end face β normally has a middle thickness. As is understood from the above description, the length of the variable holding lip 16 is supposed to vary in accordance with changes in the thickness of the flange 23. In the present embodiment, however, the front end portion of the weather strip 4 having the end face α and the rear end portion having the end face β have the same cross-sectional shape. Namely, the variable holding lip 16 has the same length in the front and rear end portions of the weather strip 4.

Figure 1B:
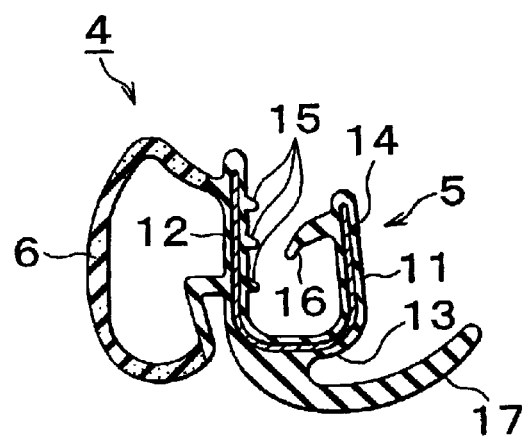
Figure 1C:
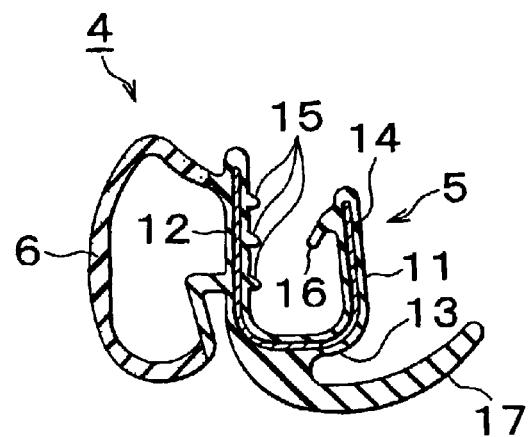

In the third embodiment, the length of the variable holding lip 16 is set in accordance with the larger one of different thickness values of the flange 23. That is, the variable holding lip 16 has a relatively small length in the frond end portion of the weather strip 4 as shown in FIG. 1C, since the thickness 23 of the corresponding portion of the flange 23 is large. Also, the variable holding lip 16 has a relatively small length in the rear end potion of the weather strip 4 as shown in FIG. 1C, though the thickness of the portion of the flange 23 corresponding to the rear end potion is not so large (i.e., is middle).

According to the embodiment constructed as described above, when the thickness of the flange 23 is within a range defined by large thickness values, the thickness of the flange 23 is classified as being "large thickness", and the length of the variable holding lip 16 is then set to be short. Thus, the insertion load required for inserting the flange 23 into the weather strip 4 (trim body 5) is less likely to increase due to the relatively large thickness of the flange 23, and the weather strip 4 can be mounted on the vehicle body with improved efficiency and ease. Conversely, when the thickness of the flange 23 is within a range defined by small thickness values, the thickness of the flange 23 is classified as being "small thickness", and the target length of the variable holding lip 16 is then set to be long. Accordingly, the weather strip 4 can be mounted on the vehicle body with improved reliability or stability, assuring sufficiently large elastic force applied to the flange 23, so that the weather strip 4 is less likely to be detached from the vehicle body.

As described above, the variable holding lip 16 has the same length in the front and rear end portions of the weather strip 4. Therefore, when the weather strip 4 is formed into an annular shape before the attachment thereof as in the embodiment, the front and rear end faces α and β can be easily and accurately joined to each other since the end faces α and β have the same sectional shape. Note that, while the weather strip 4 is formed by joining the end portions together in the present embodiment, the end portions can be connected with each other by using a metallic mold. In this case, the mold does not need to have a complicated structure as the front and rear end faces α, β have the same sectional shape, and the end portions of the weather strip 4 can be connected with each other in the mold without difficulty.

Further, when a plurality of the weather strips 4 are successively formed by extrusion molding, the length of the variable holding lip 16 need not be re-adjusted for the next front end face α after completion of extrusion molding for forming one of the weather strips, since the end faces α, β have the same cross-sectional shape. Accordingly, the weather strips can be successively produced without loss or waste, while preventing deterioration in the yield and the production efficiency.

Further, in the third embodiment, the length of the variable holding lip 16 in the front and rear end portions of the weather strip 4 is set in accordance with the larger one of different thickness values of the flange 23. Namely, the variable holding lip 16 has a relatively small length in both the front and rear end portions of the weather strip 4. Therefore, the load required for inserting the flange 23 into the trim body 5 will not increase when the length of the variable holding lip 16 is set equal with respect to the front and rear end portions of the weather strip 4. This also avoid deterioration of the production efficiency. In this case, however, the length of the variable holding lip 16 in the rear end portion of the weather strip 4 is relatively small and does not match the thickness of the flange 23. Nevertheless, the weather strip 4 is prevented from falling off or being detached from the vehicle body since the rear end portion is not so long as viewed in the longitudinal direction, and the weather strip 4 is reliably held at the front end portion and its portion adjacent to the rear end portion where the variable holding lip 16 has a large projection length.

Next, a forth embodiment of the invention will be described. In the following description, the arrangements and processes which are the same as those of the first to the third embodiments will not be described in detail, but only differences between this embodiment and the other embodiments will be mainly explained.

Figure 10:
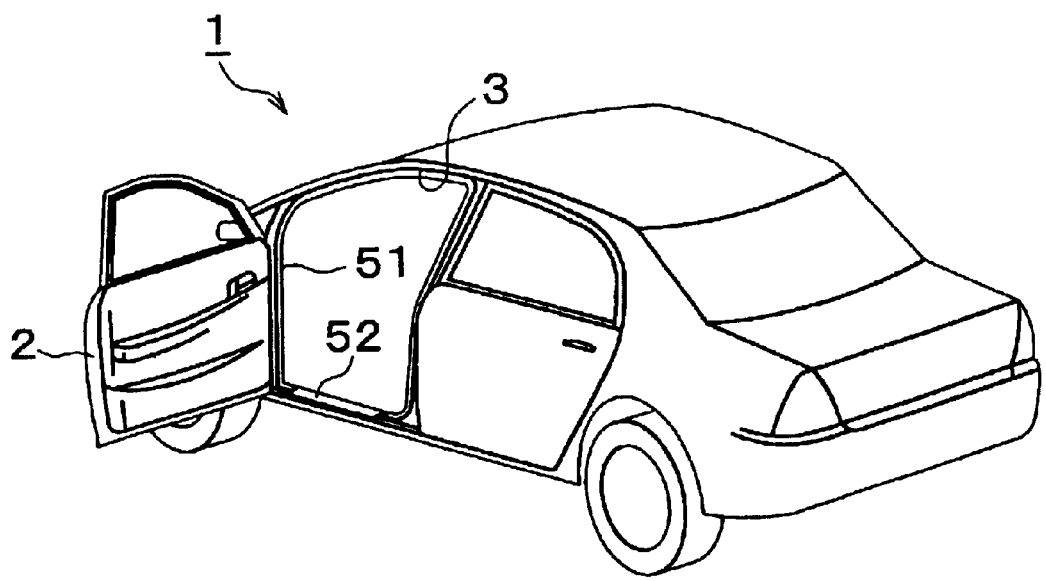
FIG. 10 is a perspective view showing a motor vehicle in which a weather strip according to a fourth embodiment of the invention is mounted.
Figure 11:
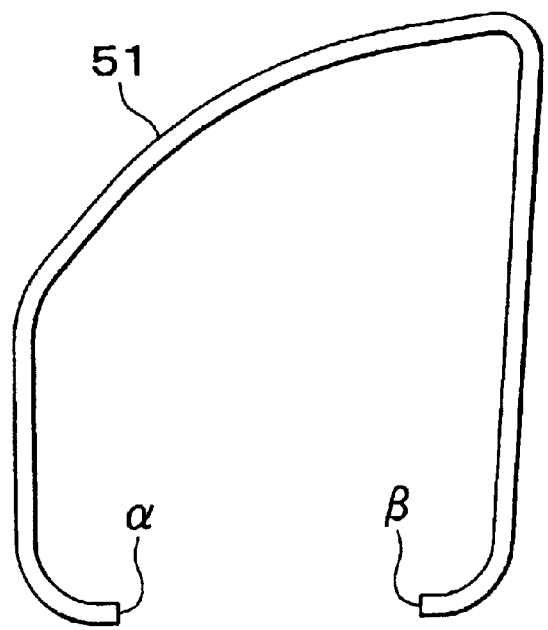
FIG. 11 is a side view schematically showing the weather strip of the fourth embodiment.

As shown in FIGS. 10 and 11, a weather strip 51 according to the embodiment is attached to almost the entire periphery of the door opening 3 except for a predetermined bottom portion thereof, and is entirely formed by extrusion molding. The weather strip 51 is obtained as one of a plurality of whether strips formed by extrusion molding, and includes longitudinally opposite end faces α and β.

Figure 12:
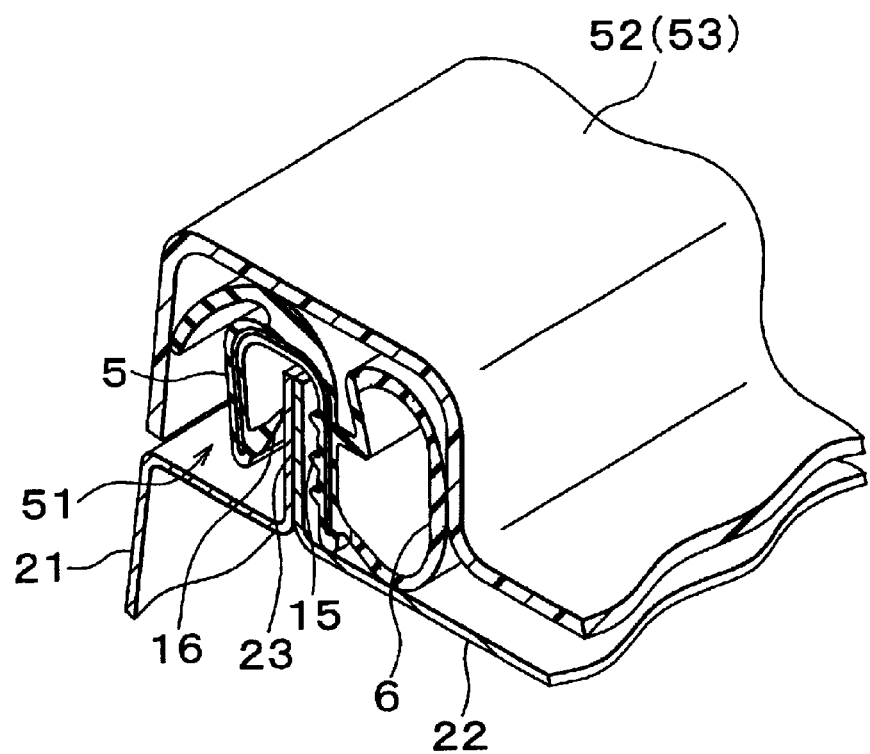
FIG. 12 is a partial perspective view showing a scuff plate provided on the weather strip of FIG. 11.

As shown in FIG. 12, the weather strip 51 of the fourth embodiment includes a trim body 5 having a substantially U-shaped cross section, and a seal portion 6 having a hollow shape. The trim body 5 includes an inner sidewall 11 facing the inside of the vehicle, an outer sidewall 12 facing the outside of the vehicle, and a connecting portion 13 that connects the inner and outer sidewalls 11, 12. A plurality of holding lips 15 are formed integrally on the inside surface of the outer sidewall 12 while a variable holding lip 16 is formed integrally on the inside surface of the inner sidewall 11. Each of the holding lips 15 has a constant length over the entire circumference of the trim body 5. In addition, the variable holding lip 16 has the same length in the front end portion and rear end portion of the weather strip 51. According to the embodiment, therefore, substantially basically the same effects and advantages as the third embodiment can be obtained. That is, when a plurality of the weather strips 4 are successively formed by extrusion molding, the length of the variable holding lip 16 need not be re-adjusted for the next front end face α after completion of extrusion molding for forming one of the weather strips, since the end faces α, β have the same cross-sectional shape. Accordingly, the weather strips can be successively produced without loss or waste, while preventing deterioration in the yield and the production efficiency. Further, the length of the variable holding lip 16 in the front and rear end portions of the weather strip 4 is set in accordance with the larger one of different thickness values of the flange 23. Namely, the variable holding lip 16 has a relatively small length in both the front and rear end portions of the weather strip 4. Therefore, the load required for inserting the flange 23 into the trim body 5 will not increase when the length of the variable holding lip 16 is set equal with respect to the front and rear end portions of the weather strip 4. This also avoid deterioration of the production efficiency.

In the embodiment, the weather strip 51 is attached to the vehicle body by fitting the trim body 5 onto almost the entire circumference of the flange 23 except for the above-indicated predetermined portion thereof. In other words, the weather strip 51 is not provided in the predetermined bottom portion of the door opening 3. Instead, a scuff plate 52 is attached to the vehicle body so as to serve as a covering member for covering the predetermined bottom portion of the door opening 3 and the front and rear end portions of the weather strip 51.

Figure 13:
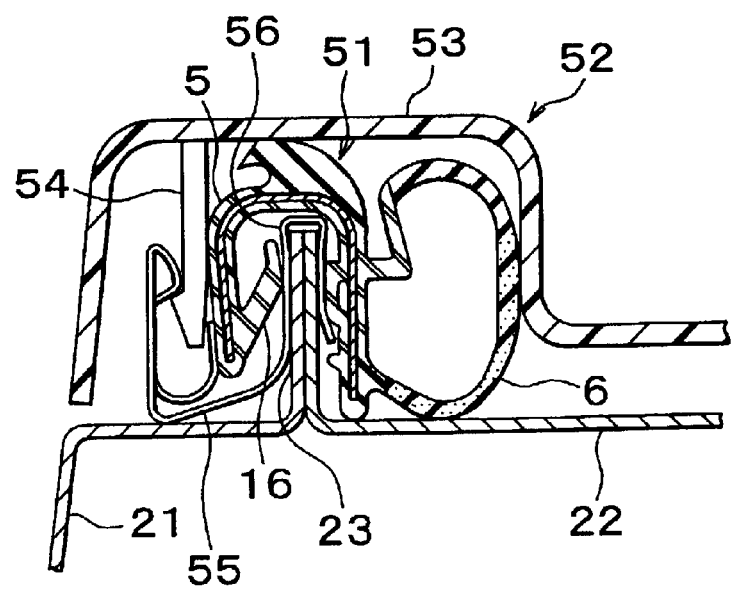
FIG. 13 is a cross-sectional view showing a mounting structure in which the scuff plate and the weather strip are mounted on the flange of the vehicle body.

As shown in FIGS. 12 and 13, the scuff plate 52 includes a main body 53 on which a passenger puts his or her foot when getting in and out of the vehicle, and an engaging portion 54 formed as a unit with the main body 53. The engaging portion 54 is provided in the vicinity of each of at least the front and rear end portions of the weather strip 51. An engaging member 55 including a fitting portion 56 is mounted on the engaging portion 54 of the scuff plate 52. By fitting the fitting portion 56 onto the flange 23, the scuff plate 52 is attached to the flange 23 of the vehicle body.

In this embodiment, the length of the variable holding lip 16 in a portion of the trim body 5 adjacent to the rear end of the weather strip 51 is set in accordance with the larger one of different thickness values of the flange 23. Thus, the variable holding lip 16 in the rear end portion of the weather strip 51 has a relatively small length, which does not match the thickness of the corresponding portion of the flange 23. Although the holding force applied from the trim body 5 to the flange 23 may be reduced in the rear end portion of the weather strip 51, the trim body 5 of the weather strip 51 is prevented from being detached from the vehicle body since the rear end portion of the weather strip 51 is covered with the scuff plate 52. Furthermore, the weather strip 51, in particular, its front and rear end portions, is/are less likely to be seen from the outside of the vehicle, assuring improved appearance quality.

Still further, in the instant embodiment, the scuff plate 52 is fitted on the flange 23 by use of the engaging member 55 attached to the scuff plate 52. Since the engaging member 55 is provided in the vicinity of each of at least the front and rear end portions of the weather strip 51, detachment of the weather strip 51 (or trim body 5) from the flange 23 of the vehicle body can be surely prevented.

It is to be understood that the invention is not limited to the above-described embodiment, but may be embodied with changes or modifications in the manners (b) to (g) as described above, or in the manners (h) to (k) as described below by way of example. Needless to say, the invention may be applied with changes or modifications other than those as described below.

(h) While the length of the variable holding lip 16 is changed among three lengths throughout the entire circumference of the weather strip 51 in the fourth embodiment, the length of the variable holding lip 16 may be continuously and gradually changed in one or more portion(s) of the weatherstrip 51.

(i) While the weather strip 51 is not provided in the predetermined bottom portion of the door opening 3 in the fourth embodiment, the weather strip 51 may be provided in the predetermined bottom portion of the door opening 3. Namely, even if the scuff plate 52 is provided as in the fourth embodiment, the weather strip 51 may be attached to the entire circumference of the door opening 3.

(j) The engaging member(s) 55 as used in the fourth embodiment may be eliminated, and the scuff plate 52 may be directly fitted onto the flange 23.

(k) While the scuff plate 52 covers the entire weather strip 51 having the trim body 5 and the seal member 6 in the fourth embodiment, the scuff plate 52 may be constructed so as to cover only the trim body 5 such that the seal member 6 is exposed to the outside, for example.

Hereinafter, one example of a method of manufacturing the weather strip according to any one of the illustrated embodiments will be described with reference to FIG. 14 to FIG. 18. The weather strip 4 of each of the illustrated embodiments includes the trim body 5 and the seal member 6 as shown in FIGS. 1A to 1C and FIGS. 3A to 3C. The trim body 5 includes the inner sidewall 11, the outer sidewall 12, and the connecting portion 13 connecting the sidewalls 11 and 12. The connecting portion 13 has a substantially curved shape in section and thus the trim body 5 as a whole has a substantially U-shape in section.

A plurality of holding lips 15 are formed integrally on the inner surface of the outside sidewall 12. On the other hand, a variable holding lip 16 is formed integrally on the inner surface of the inside sidewall 11. Further, a cover lip 17 for covering an edge of the interior, such as a garnish (not shown), is formed as an integral part of the connecting portion 13.

Figure 15:
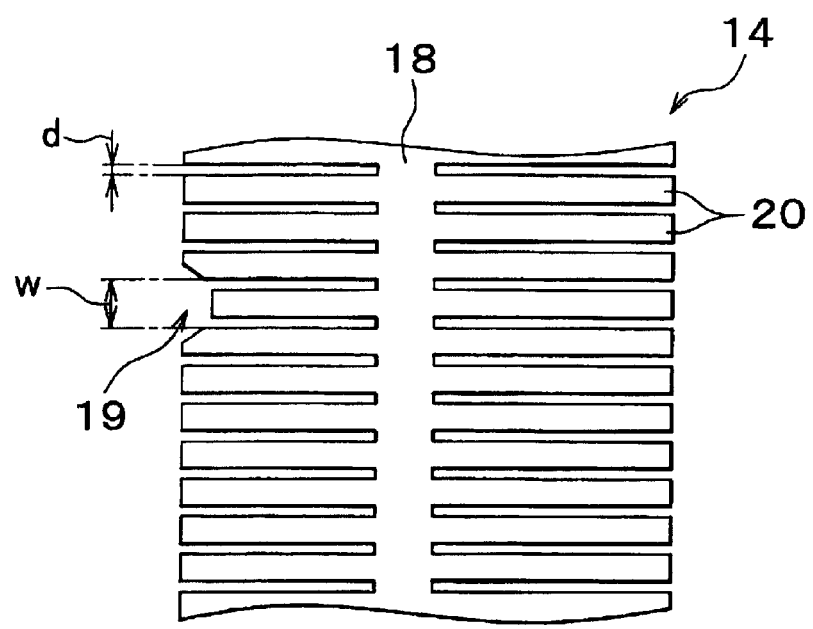
FIG. 15 is a partial plan view showing an insert embedded in a trim body of the weather strip.

The trim body 5 is basically formed of EPDM (ethylene-propylenediene terpolymer) solid rubber as a covering material, and a metal insert 14 formed of a magnetic material is embedded in the trim body 5. As shown in FIG. 15, the insert 14 includes wings 20 and a connecting portion 18 for connecting almost the middle parts of the wings 20. Thus, the insert 14 may be referred to as "center bond type". The wings 20 are arranged at predetermined intervals in the longitudinal direction of the weather strip 4, such that each wing 20 extends in a direction perpendicular to the longitudinal direction of the weather strip 4. With the insert 14 embedded in the weather strip 4, the weather strip 4 is provided with a certain degree of strength, while at the same time being capable of changing its three-dimensional shape.

In the embodiment, prior to the extrusion molding, notches 19 are formed as marking in the insert 14 at equal intervals of a predetermined length (i.e., the length of the weather strip as a product). The width W of each of the notches 19 is set to be sufficiently larger than the interval d between adjacent ones of the wings 20. In the embodiment, the notch 19 is formed at a location where a work 4A with a great length (which will be described) is cut into individual weather strips 4.

The weather strip 4 is attached to the vehicle body by fitting the trim body 5 onto the periphery of the door opening 3. More specifically, a flange (not shown) is formed by edge portions of vehicle body panels, and the trim body 5 is fitted onto the flange thus formed. In the embodiment, the thickness of the flange at the periphery of the door opening 3 varies from one portion thereof to another, and the length of the variable holding lip 16 is changed in the longitudinal direction of the weather strip 4 in accordance with the thickness of the flange. It is, however, to be noted that the length of the variable holding lip 16 is not continuously and gradually changed in accordance with the thickness of the flange, but is changed among three lengths as shown in FIGS. 1A to 1C.

Figure 16:
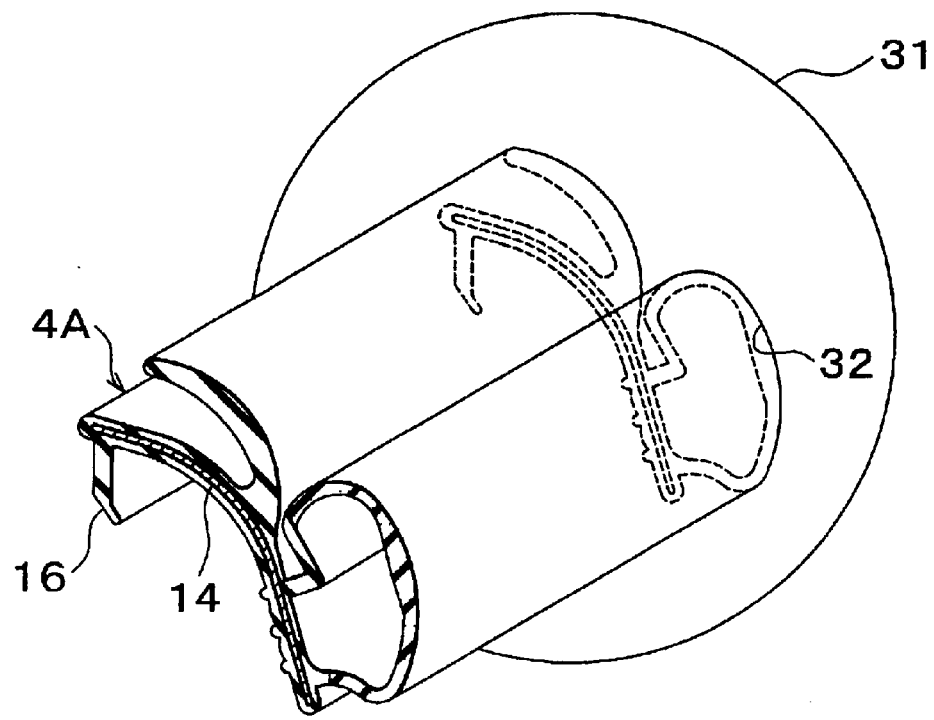
FIG. 16 is a perspective view schematically showing a die used for extrusion molding of the weather strip, along with a part of the work.

FIG. 16 schematically shows a die 31, or the like, which is used for extrusion molding for forming the above-described weather strip 4 (which will be called "work 4A" as it is a pre-product before cutting-off into individual weather strips). The die 31 has a forming aperture 32 for forming the work 4A, and an unvulcanized rubber material that provides a covering material is extruded through the forming aperture 32. A portion of the forming aperture 32 corresponding to the trim body 5 has a substantially flat shape, and the rubber material is extruded through the thus formed aperture 32, followed by a step in which the formed article is curved into its final shape. Into the above-indicated portion of the forming aperture 32 is also continuously supplied the insert 14 as well as the unvulcanized rubber material. Thus, the rubber material is extruded along with the insert 14 so as to form the work 4A having a large length. A shutter or the like (not shown) serving as a mechanism for changing the length of the variable holding lip 16 is provided on the front surface of the die 31. By sliding the shutter, the length of the variable holding lip 16 can be changed as desired.

Figure 14:
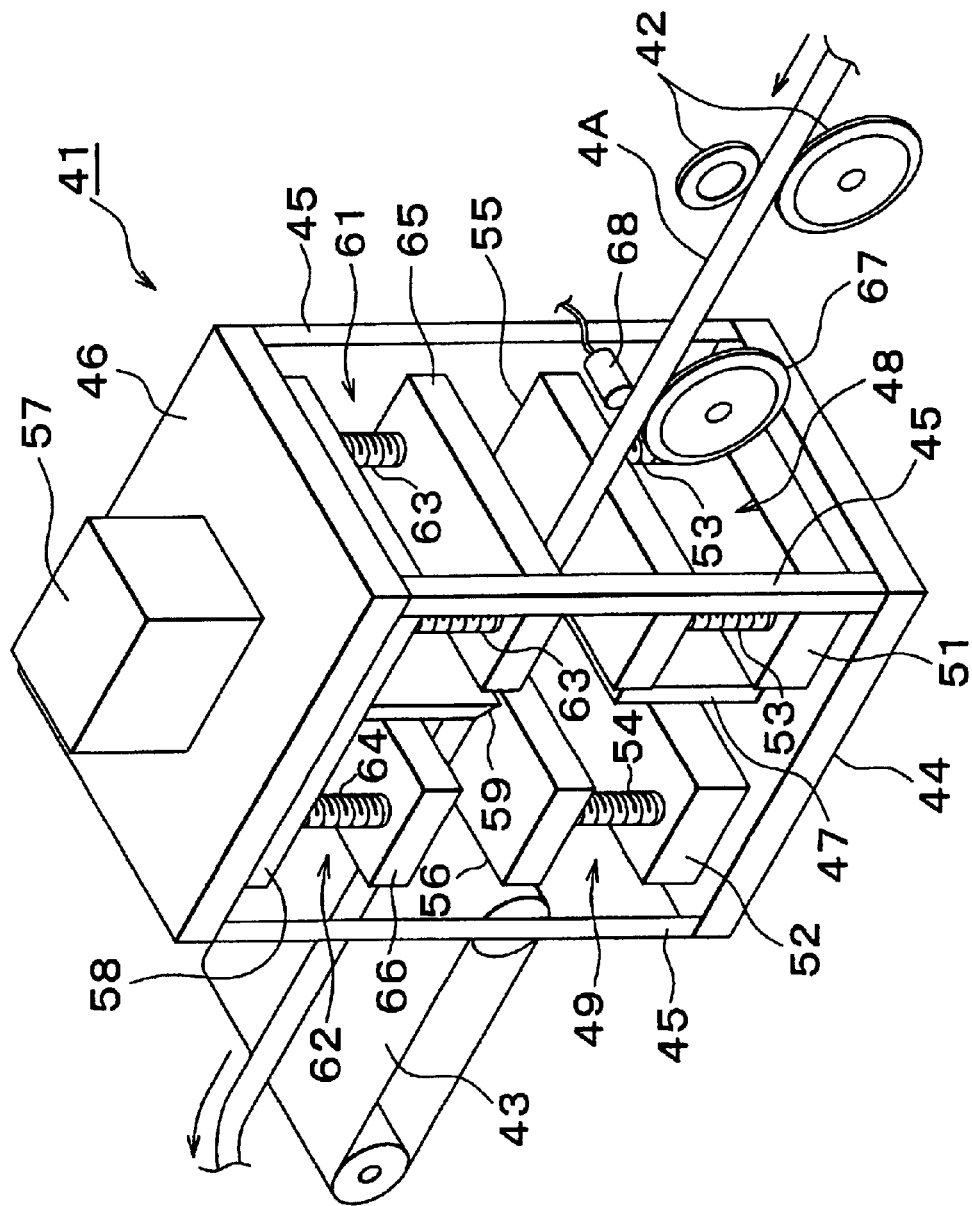
FIG. 14 is a perspective view showing a cutting device, a work, and the like, which are used in a method of manufacturing weather strips according to another embodiment of the invention.

The work 4A thus formed by extrusion then goes through a vulcanization process and a bending process, followed by a cutting process. FIG. 14 is a schematic perspective view showing a cutting device 40 and others which are used in the cutting process in this embodiment. A pair of upper and lower feeding rollers 42 are provided upstream of the cutting device 40 while a conveyer 43 is provided downstream of the cutting device 40. The cutting device 40 includes a lower plate 44, and four pillars 45 that stand upright on the lower plate 44. An upper plate 46 is fixed on the top faces of the pillars 45. A stationary cutter blade 47 is supported in a fixed state on the lower plate 44. Work supporting mechanisms 48, 49 are provided upstream and downstream of the stationary cutter blade 47, respectively. Each work supporting mechanism 48, 49 includes a coil spring 53, 54 erected on a supporting base 51, 52, and a receiving plate 55, 56 provided on the top of the coil spring 53, 54. The receiving plates 55, 56 are both disposed at a higher position than the upper end of the stationary cutter blade 47.

Figure 18:
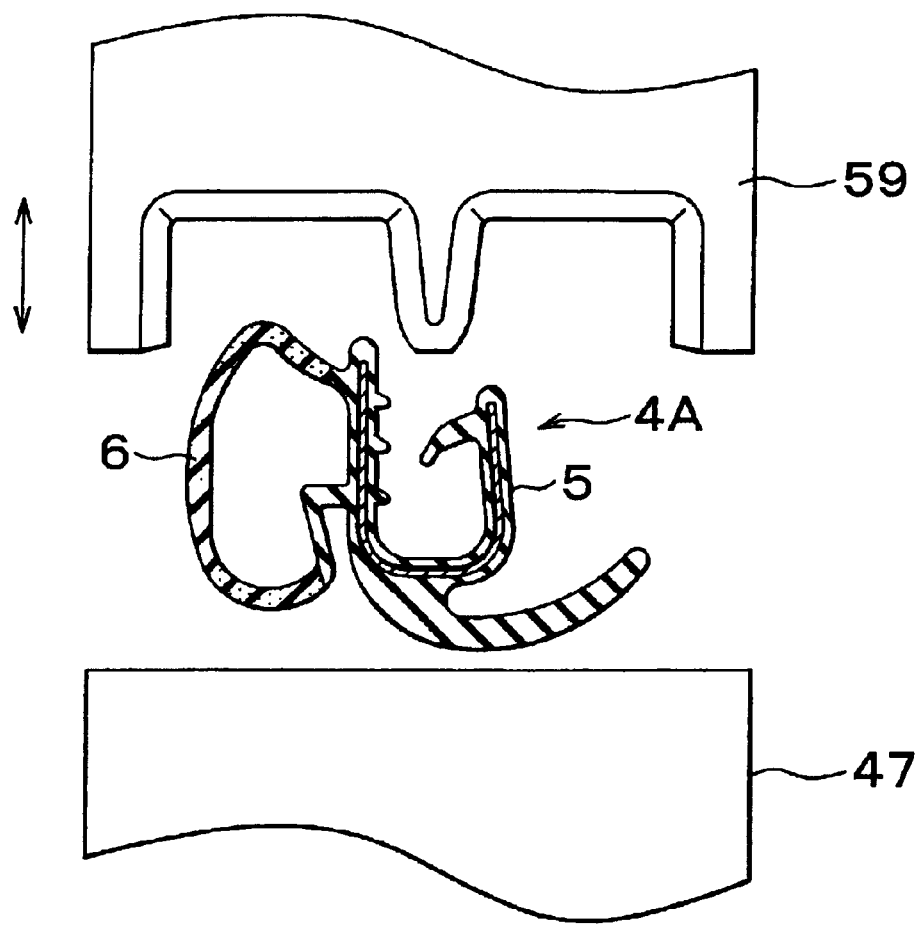
FIG. 18 is a partly cross-sectional view showing a stationary cutter blade, a movable cutter blade, and the work.

Further, a cylinder 57 is provided on the upper plate 46. A rod (not shown) is retractably received in the cylinder 57, and a movable plate 58 is connected to the tip (or the lower end) of the rod. A movable cutter blade 59 is provided on the lower face of the movable plate 58. Work pressing mechanisms 61, 62 are provided on the upstream and downstream sides of the movable cutter blade 59, respectively, such that the pressing mechanisms 61, 62 face the work supporting mechanisms 48, 49. Each of the work pressing mechanisms 61, 62 includes a coil spring 63, 64 hanging from the movable plate 58, and a pressure plate 65, 66 which is attached to the lower end of the coil spring 63, 64. The pressure plates 65, 66 are both disposed at a lower position than the lower end of the movable cutter blade 59. As shown in FIG. 18, a cutting portion of the moving cutter blade 59 is formed in an uneven shape in line with the sectional shape of the work 4A so as to avoid deformation of the work 4A upon cutting. Thus, the stationary cutter blade 47 and the movable cutter blade 59 constitute a cutter in this embodiment.

Figure 17A:
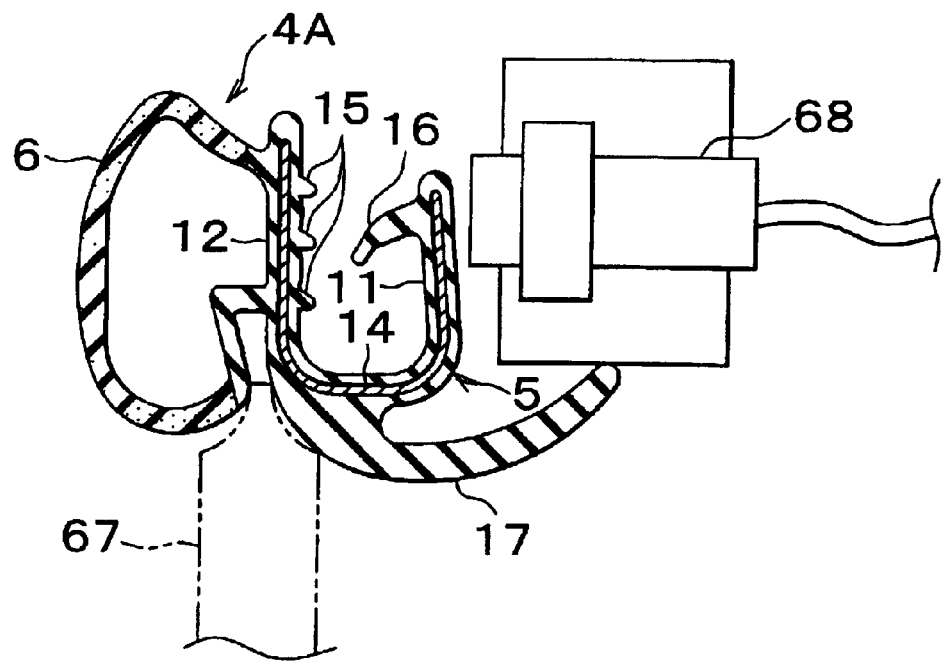
FIGS. 17A and 17B are partly cross-sectional views showing a proximity switch and the weather strip.
Figure 17B:
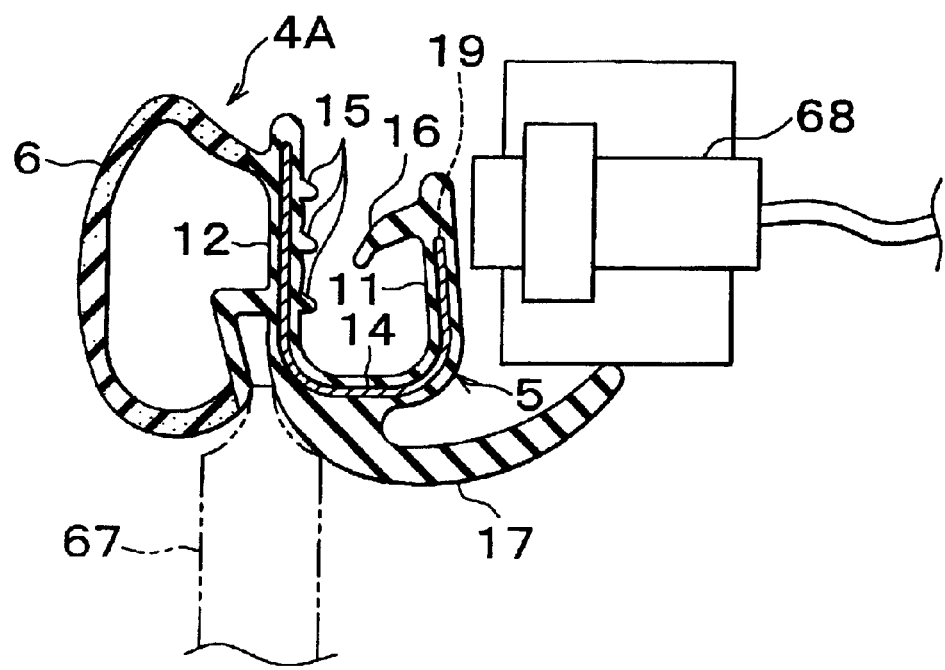

Referring back to FIG. 14, a support roller 67 and a proximity switch 68 as a detector are provided in the vicinity of and somewhat upstream of the stationary cutter blade 47 and the movable cutter blade 59. As shown in FIGS. 17A and 17B, the proximity switch 68 is disposed in the vicinity of the trim body 5 of the work 4A such that the switch 68 faces the inner sidewall 11 of the trim body 5 without contacting with the inner sidewall 11. With the proximity switch 68, the presence of the magnetic material, namely, the presence of the insert 14 inside the work 4A can be detected through the rubber material on the basis of a change in eddy current in the proximity switch 68.

Next, the method of manufacturing the weather strip 4 constructed as described above, in particular, the cutting process, will be described in detail.

As described above, prior to the extrusion process, the notches 19 as marking are first formed in the insert 14 at equal intervals of a predetermined length (i.e., length of each product) by punching. In the extrusion process, as shown FIG. 16, unvulcanized rubber is continuously extruded together with the insert 14, so as to form the work 4A having a large length and the same cross-sectional shape as the weather strip 4.

The work 4A thus obtained by extrusion then goes through a vulcanization process and a bending process, and is then guided to the cutting device 40. Here, the work 4A is transported or fed by the upper and lower feeding rollers 42, the conveyor 43, and the like. While the work 4A is being transported, the insert 14 (more particularly, the wings 20 of the insert 14) is almost continuously detected by the proximity switch 68 as shown in FIG. 17A. As shown in FIG. 17B, the eddy current in the proximity switch 68 decreases each time one of the notches 19 reaches a position facing the proximity switch 68, and the presence of the notch 19 is detected through the rubber material, by detecting a reduction in the eddy current.

When the presence of the notch 19 is detected in the above-described manner, the cylinder 57 as shown in FIG. 14 is driven to lower the movable plate 58. At this time, the work pressing mechanisms 61, 62 are moved together with the movable plate 58. More specifically, the pressure plates 65, 66 first abut on the receiving plates 55, 56 with the work 4A interposed therebetween. Thus, the work 4A is supported such that its portions located upstream and downstream of the stationary cutter blade 47 and the movable cutter blade 59 are sandwiched between the pressure plates 65, 66 and the receiving plates 55, 56, respectively. If the movable plate 58 continues to be lowered, the movable cutter blade 59 comes close to the stationary cutter blade 47 with the coil springs 53, 54, 63, and 64 being compressed. Then, the work 4A is cut off when the tip of the movable cutter blade 59 protrudes downward beyond the pressure plates 65, 66. Thus, the weather strip 4 having the predetermined length is obtained on the downstream side of the stationary cutter blade 47 and the movable cutter blade 59. Here, lowering of the movable plate 58 is carried out in a moment, and the movable plate 58 thus lowered is returned to its original position (i.e., moved upward) immediately after the work 4A is cut off.

As described above in detail, according to the embodiment, the notches 19 are formed in the insert 14 at equal intervals of the predetermined length prior to the extrusion process. In the cutting process, the work 4A is cut off on the basis of detection of the notches 19 by the proximity switch 68. Accordingly, even if a bent is present in a portion of the work 4A located closer to the leading end thereof than (downstream of) its cut-off position, the work 4A can be cut off at a length which is almost equal to the predetermined length, regardless of such a bent. Further, even if a slippage occurs between the work 4A and one of the rollers during the transportation of the work 4A, the work 4A can be cut off at a length which is almost equal to the predetermined length, regardless of such a slippage. Furthermore, since the work 4A is cut off based on the detection of the notches 19 (marking) which are formed in advance, the initial interval between the adjacent notches 19 provides the length of the weather strip 4 without being changed, provided that the insert 14 hardly expands or shrinks.

Further, since the work 4A is cut off on the basis of the detection by the proximity switch 68 provided in the vicinity of the stationary cutter blade 47 and the movable cutter blade 59, the work 4A can be cut off at a more accurate position as compared with the case where the work 4A is cut off at its trailing end on the basis of a result of detection of the leading end. Accordingly, the above-described effects and advantages can be surely provided.

Further, since the width W of each of the notches 19 is larger than the predetermined interval d between the adjacent wings 20, the proximity switch 68 is prevented from detecting a gap between the adjacent wings 20 as the notch 19 by mistake in the cutting process. Therefore, the work 4A can be prevented from being cut off at a position which is different from the predetermined position. In other words, the work 4A can be cut off into weather strips with high accuracy.

Additionally, in the case where the length of the variable holding lip 16 is changed in the longitudinal direction of the work 4A, the weather strip 4 having a different length from that predetermined length may not be used as an appropriate product. In the embodiment, however, such a problem can be suppressed since the length of the weather strip 4 can be controlled to be almost equal to the predetermine length.

It is to be understood that the invention is not limited to the above-described embodiment, but may be embodied with various changes or modifications as described below by way of example. Needless to say, the invention may be applied with changes or modifications other than those as described below.

(l) For example, another detector for detecting the notch 19 may be provided at a position corresponding to the die 31 used for extrusion molding. In this case, the timing for starting extrusion, timing for moving the shutter 32, and the like may be controlled on the basis of the detection timing of the detector provided in conjunction with the die 31 and the detection timing of the proximity switch 68.

(m) The insert 14 may be provided with some form of marking other than the notches 19. For example, the marking may be in the form of a hole or aperture that is equivalent to the notch 19, a magnet, an insulating plate, or the like.

(n) While the cutter used in the illustrated embodiment is a combination of the stationary cutter blade 47 and the movable cutter blade 59, other types of cutters, such as a laser cutter, may also be used.

(o) While the proximity switch 68 is provided in the vicinity of the cutter in the illustrated embodiment, the proximity switch 68 may be provided in a position that is exactly adjacent to the cutter. In this case, the cut-off position of the work 4A exactly corresponds to the notch 19, which leads to improved accuracy in cutting off the work 4A.

(p) In the above-described embodiment, the invention is applied to the method of manufacturing the weather strip 4 provided on the periphery of the door opening 3 of the vehicle body that faces the door 2 (side-front door). However, the invention may be applied to methods of manufacturing weather strips provided on the periphery of door openings of other doors, such as a rear door, a back door, a luggage door (trunk lid), and a roof door (a sliding roof panel), or weather strips provided on the periphery of such doors, or various types of weather strips, such as a glass run, having a predetermined length.

(q) While the length of the variable holding lip 16 is changed in among three lengths in the above-described embodiment, the length may be changed between two lengths or among four lengths or more. Moreover, the length of the variable holding lip 16 may be continuously and gradually changed in one or more portions of the weather strip 4. Furthermore, the invention may be applied to a weather strip having a constant length of a variable holding lip throughout the entire circumference of the weather strip 4.

(r) While the trim body 5 is formed of solid rubber and the seal portion 6 is formed of sponge rubber in the above-described embodiment, the trim body 5 and the seal portion 6 may be formed of the same material. Further, while EPDM is referred to as an example of the material for forming the weather strip 4 in the above-described embodiment, other rubber materials, such as IR (isoprene rubber) and CR (chloroprene rubber), thermoplastic olefin-containing elastomer (TPO), or other materials, such as flexible polyvinyl chloride, having a rubber-like elasticity may be used as a material for the weather strip 4.

What is claimed is:

1. A weather strip comprising:
    a trim body having a generally U-shaped cross section, the trim body being adapted to hold a flange provided at a periphery of an opening formed in a motor vehicle;
    a hollow seal portion that is adapted to protrude toward an outside of the motor vehicle from an outside surface of the trim body, the seal portion being adapted to come in contact with a closure member that closes the opening; and
    a first holding lip being formed on a first side of the trim body so as to extend from an inside surface of the trim body toward an inside of the trim body, an with a length that varies according to a thickness of the flange; and
    at least one second holding lip being formed on a second side of the trim body opposite the first side so as to extend from the inside surface of the trim body toward the inside of the trim body with a length that is constant.

2. The weather strip according to claim 1, wherein the length of the first holding lip corresponding to a section of the flange having a first said thickness is made shorter than the length of the first holding lip corresponding to a section of the flange having a smaller second said thickness, and each section of the first holding lip having the length corresponding to the section of the flange having the first thickness is made longer than the section of the flange having the first thickness along a longitudinal direction of the weather strip.

3. The weather strip according to claim 2, wherein an amount by which each said section of the first holding lip is made longer than the section of the flange having the first thickness is set based on a longitudinal position of the weather strip relative to the flange.

4. The weather strip according to claim 2, wherein the first holding lip has a distal end portion having a constant shape.

5. The weather strip according to claim 1, wherein:
    the flange includes at least one large-thickness portion, at least one small-thickness portion, and at least one stepped portion between the at least one large-thickness portion and the at least one small-thickness portion; and
    the length of the first holding lip includes at least one long-length section and at least one short-length section which are arranged in a longitudinal direction of the weather strip, each of the at least one short-length section of the first holding lip corresponds to a respective one of the at least one large-thickness portion of the flange for extending beyond a corresponding one of the at least one stepped portion in the longitudinal direction of the weather strip.

6. The weather strip according to claim 1, wherein the first holding lip has a distal end portion having a constant shape.

7. The weather strip according to claim 1, wherein:
the length of the holding lip is changed along the first longitudinal direction of a weather strip in accordance with the thickness of the flange so that the length of the first holding lip decreases with an increase in the thickness of the flange; and
the first holding lip includes longitudinally opposite end portions having substantially the same length.

8. The weather strip according to claim 1, wherein the length of the first holding lip includes at least two of long, medium, and short length sections.

9. A weather strip comprising:
a trim body having a generally U-shaped cross section and including an inner sidewall that is adapted to face an inside of a motor vehicle, an outer sidewall that is adapted to face an outside of the motor vehicle, and a connecting portion that connects the inner and outer sidewalls, the trim body being adapted to hold a flange provided at a periphery of an opening formed in the motor vehicle;
a hollow seal portion that is adapted to protrude toward the outside of the motor vehicle from an outside surface of the outer sidewall, the seal portion being adapted to come in contact with a closure member that closes the opening; and
a plurality of holding lips formed on the trim body so as to extend from inside surfaces of the inner sidewall and the outer sidewall toward an inside of the trim body,
wherein at least one of the holding lips that extends from one of the inner and outer sidewalls extends toward the inside of the trim body with a constant length, and at least one of the holding lips that extends from the other of the inner and outer sidewalls extends toward the inside of the trim body with a length that varies according to a thickness of the flange.

10. A weather strip comprising:
a trim body hating a generally U-shaped cross section and including an inner sidewall that is adapted to face an inside of a motor vehicle, an outer sidewall that is adapted to face an outside of the motor vehicle, and a connecting portion that connects the inner and outer sidewalls, the trim body being adapted to hold a flange, the flange being provided at a periphery of an opening formed in the motor vehicle;
a hollow seal portion that is adapted to protrude toward the outside of the motor vehicle from an outside surface of the outer sidewall, the seal portion being adapted to come in contact with a closure member that closes the opening; and
a plurality of holding lips formed on the trim body so as to extend from inside surfaces of the inner sidewall and the outer sidewall toward an inside of the trim body,
wherein at least one of the holding lips that extends from one of the inner and outer sidewalls extends toward the inside of the trim body with a constant length, and at least one of the holding lips that extends from the other of the inner and outer sidewalls extends toward the inside of the trim body with a length that varies in accordance with a thickness of the flange so that the length of the at least one holding lip having the variable length decreases with an increase in the thickness of the flange, and
wherein the at least one holding lip having the variable length includes longitudinally opposite end portions having substantially the same length.

* * * * *